US012111037B2

(12) United States Patent
Pratt

(10) Patent No.: US 12,111,037 B2
(45) Date of Patent: Oct. 8, 2024

(54) LAMPSHADE RING ASSEMBLY, LAMPSHADE APPARATUS, AND METHOD OF ASSEMBLING THE SAME

(71) Applicant: Ponderose LLC, San Luis Obispo, CA (US)

(72) Inventor: Nathaniel David Pratt, San Luis Obispo, CA (US)

(73) Assignee: Ponderose LLC

( * ) Notice: Subject to any disclaimer, the term of this patent is extended or adjusted under 35 U.S.C. 154(b) by 0 days.

(21) Appl. No.: 18/526,354

(22) Filed: Dec. 1, 2023

(65) Prior Publication Data

US 2024/0183513 A1 Jun. 6, 2024

Related U.S. Application Data

(60) Provisional application No. 63/429,612, filed on Dec. 2, 2022.

(51) Int. Cl.
*F21V 1/04* (2006.01)

(52) U.S. Cl.
CPC .................................... *F21V 1/04* (2013.01)

(58) Field of Classification Search
CPC ........................................................ F21V 1/04
See application file for complete search history.

(56) References Cited

U.S. PATENT DOCUMENTS

| | | | |
|---|---|---|---|
| 5,868,492 | A | 2/1999 | Strickland |
| 6,315,434 | B1 | 11/2001 | Long |
| 6,851,836 | B2 | 2/2005 | Chou |

OTHER PUBLICATIONS

Amazon Website "I Like That Lamp Wire Lamp Shade Rings with European Fitter (8" Diameter), Includes 2 Galvanized Steel Silver Drum Rings, Make DIY Table/Floor/Pendant Compatible with most IKEA &Target Lamps", https://www.amazon.com/Like-That-Lamp-Galvanized-Compatible/dp/B07CJJMY38/ref=asc_df_B07CJJMY38/?hvadi=undefined&linkCode=df0&tag=hyprod-20&th=1, Retrieved Dec. 1, 2022, pp. 1-10.

Etsy Website "Lamp Shade Hardware, Washer Top Fittings", https://www.etsy.com/listing/265907064/lamp-shade-hardware-washer-top-fittings?ga_order=most_relevant&ga_search_type=all&ga_view_type=gall%E2%80%A6, Retrieved Dec. 1, 2022, pp. 1-16.

Etsy Website "Lampshade ring sets" https://www.etsy.com/listing/1254030480/lampshade-ring-sets-15cm-30cm-macrame?ga_order=most_relevant&ga_search_type=all&ga_view_type=%E2%80%A6, Retrieved Dec. 1, 2022, pp. 1-11.

*Primary Examiner* — Joseph L Williams
(74) *Attorney, Agent, or Firm* — The Belles Group, P.C.

(57) ABSTRACT

A lampshade ring assembly, a lampshade apparatus including the lampshade ring assembly and a lampshade, and a method of assembling the same. The lampshade ring assembly may include a mounting hub having a plurality of first mounting elements arranged in a spaced apart manner, an outer ring having a plurality of second mounting elements arranged in a spaced apart manner, and a plurality of connectors each having a first end with a third mounting element and a second end with a fourth mounting element. The connectors may be detachably coupled to: (1) the mounting hub via engagement between the first mounting elements and the third mounting element; and (2) the outer ring via engagement between the second mounting elements and the fourth mounting element. The outer ring may be configured to be coupled to a lampshade and the mounting hub may be configured to be coupled to a light fixture.

20 Claims, 26 Drawing Sheets

LAMPSHADE RING ASSEMBLY, LAMPSHADE APPARATUS, AND METHOD OF ASSEMBLING THE SAME

CROSS-REFERENCE TO RELATED APPLICATION

This application claims the benefit of priority from U.S. Provisional Patent Application Ser. No. 63/429,612, filed Dec. 2, 2022, the entirety of which is hereby incorporated herein by reference.

BACKGROUND

The ambiances of indoor and outdoor spaces have long benefited from the gentle diffusion of photons from their primary sources (e.g., light bulbs). Modern light bulbs, whether they be light emitting diode (LED), incandescent or fluorescent, are frequently connected to a power source via a cylindrical socket. Diffusion devices, known colloquially as lampshades, are often oriented around light bulbs via attachment to the socket. The distance of the shade material to the light bulb and respective vertical positioning of the shade along the light bulb's vertical axis governs the quality and attributes of the diffusion. Currently, lampshade ring assemblies which facilitate the attachment of the lampshade to the light fixture, are made from a metal wire and have limitations in regard to modularity, case of manufacture and assembly, and cost. A need exists for a ring assembly for a lampshade that overcomes the deficiencies of currently existing products.

BRIEF SUMMARY

The invention may be directed to a lampshade ring assembly, a lampshade apparatus including the lampshade ring assembly and a lampshade, and a method of assembling a lampshade apparatus.

In one aspect, the invention may be a lampshade ring assembly comprising: a mounting hub comprising a plurality of first mounting elements arranged in a spaced apart manner; an outer ring comprising a plurality of second mounting elements arranged in a spaced apart manner; a plurality of connectors, each of the connectors comprising a first end having a third mounting element and a second end having a fourth mounting element; wherein each of the connectors is configured to be detachably coupled to: (1) the mounting hub via engagement between one of the first mounting elements of the mounting hub and the third mounting element of the connector; and (2) the outer ring via engagement between one of the second mounting elements of the outer ring and the fourth mounting element of the connector; and wherein the outer ring is configured to be coupled to a lampshade and the mounting hub is configured to be coupled to a light fixture.

In another aspect, the invention may be a lampshade apparatus comprising: a ring assembly comprising: a mounting hub comprising a top surface, a bottom surface, and an outer surface, a fixture mounting hole extending through the mounting hub from the top surface to the bottom surface, and a plurality of hub apertures formed into the outer surface of the mounting hub and arranged in a spaced apart manner; an outer ring comprising an inner surface that bounds a central aperture, a plurality of ring apertures formed into the inner surface of the outer ring and arranged in a spaced apart manner; a plurality of connectors, each of the connectors being elongated between a first end of the connector and a second end of the connector, each of the plurality of connectors being detachably coupled to the mounting hub and to the outer ring by inserting the first end of each of the connectors into one of the hub apertures of the mounting hub and inserting the second end of each of the connectors into one of the ring apertures of the outer ring, thereby forming the ring assembly; and a lampshade having a top edge and a bottom edge, the ring assembly being coupled to the lampshade with the outer ring in engagement with one of the top and bottom edges of the lampshade.

In yet another aspect, the invention may be a method of assembling a lampshade apparatus, the method comprising: attaching each of a plurality of connectors to a mounting hub by engaging a third mounting element of each of the connectors to one of a plurality of first mounting elements of the mounting hub; after the plurality of connectors are attached to the mounting hub, attaching each of the plurality of connectors to an outer ring by engaging a fourth mounting element of each of the connectors to one of a plurality of second mounting elements of the outer ring, thereby forming a ring assembly of the lampshade apparatus; and attaching the ring assembly to a top edge or a bottom edge of a lampshade, thereby forming the lampshade apparatus that is configured to be coupled to a light fixture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
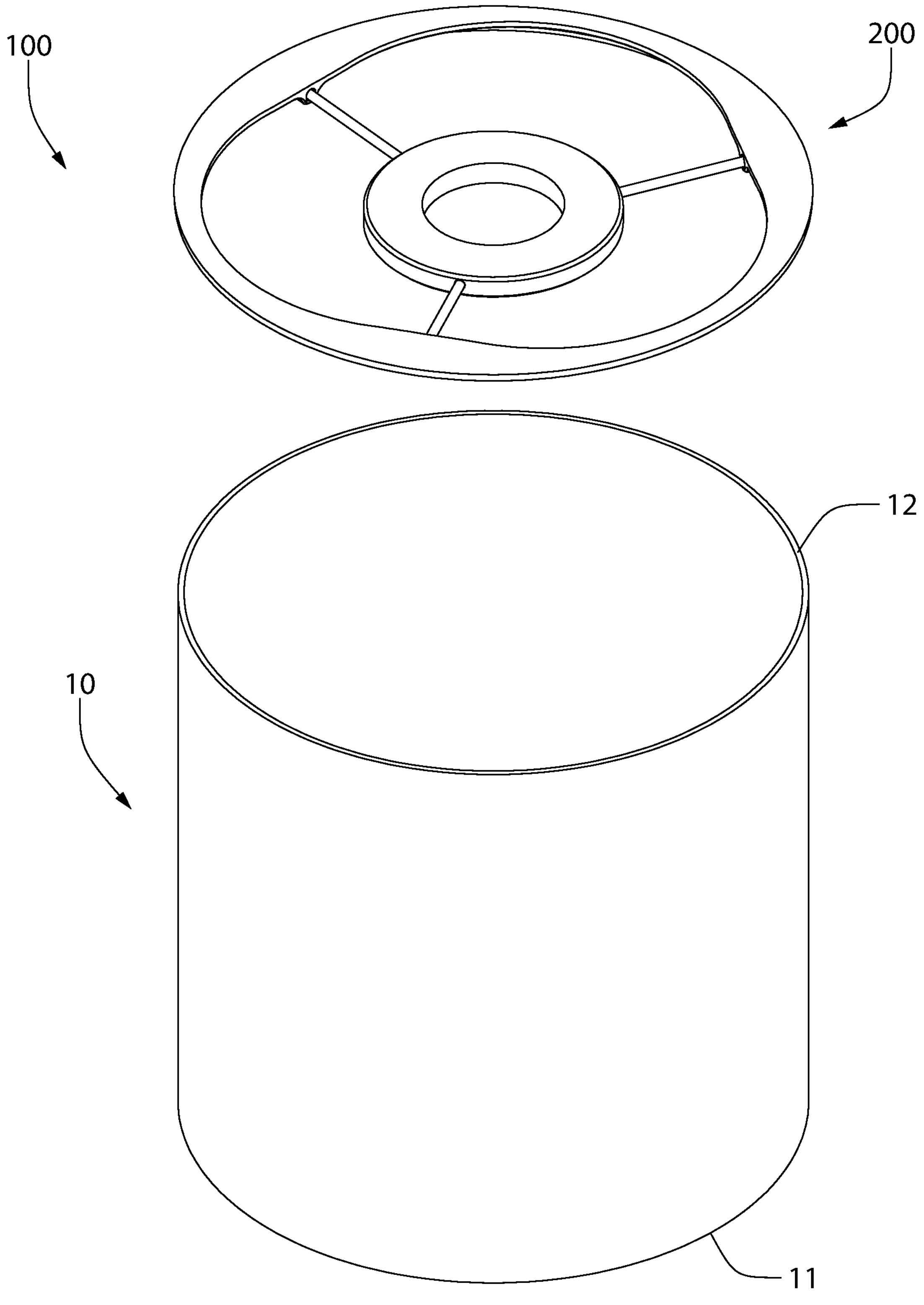
FIG. 1 is an exploded perspective view of a lampshade apparatus including a ring assembly and a lampshade in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top” and “bottom” as well as derivatives thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring to FIG. 1, a lampshade apparatus 100 is illustrated in accordance with an embodiment of the present invention. The lampshade apparatus generally comprises a lampshade 10 and a ring assembly 200 (the ring assembly 200 is also referred to herein as a lampshade ring assembly). The ring assembly 200 is configured to be coupled to the lampshade 10 to form the lampshade apparatus 100 which may then be coupled to a light fixture. The ring assembly 200 may ensure that the lampshade 100 is properly positioned relative to the light fixture. The lampshade 10 may have a bottom edge 11 and a top edge 12 The lampshade 10 may be formed in an additive manufacturing process from a thermoplastic material. Alternatively, the lampshade 10 may be formed using more conventional techniques out of fabrics such as cotton, silk, or the like. While a somewhat generic lampshade 10 is illustrated in the drawings, the specific details of the lampshade including its shape, structure, material of construction, ornamentation, and the like is not to be limiting of the present invention. Thus, a large variety of different styles, sizes, shapes, and the like may be used for the lampshade 10 in accordance with the disclosure set forth herein.

Figure 2:
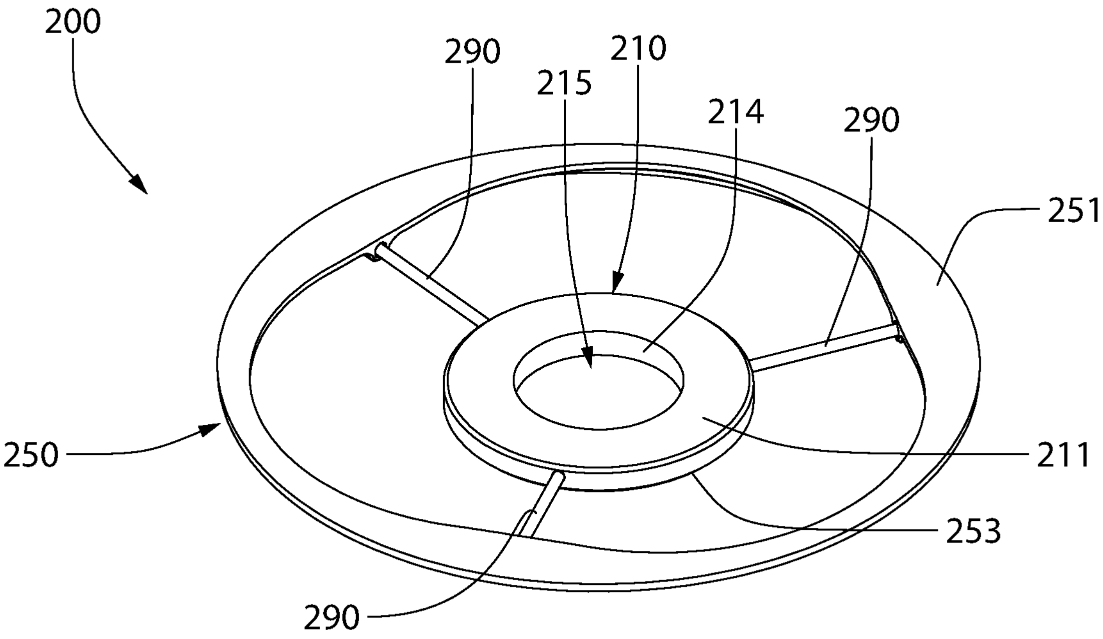
FIG. 2 is a front perspective view of the ring assembly of FIG. 1.
Figure 3:
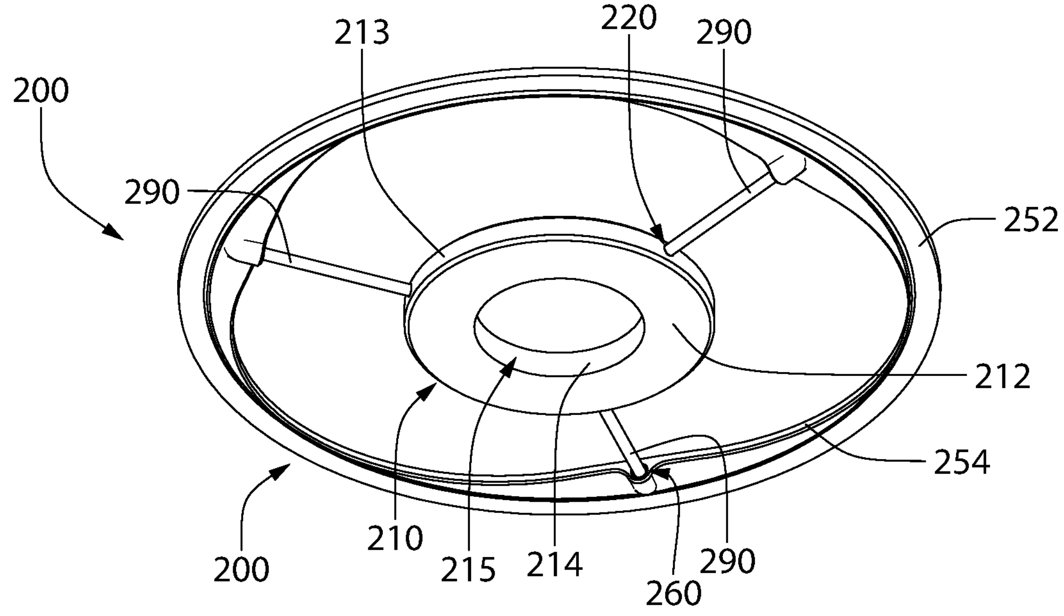
FIG. 3 is a bottom perspective view of the ring assembly of FIG. 1.
Figure 4:
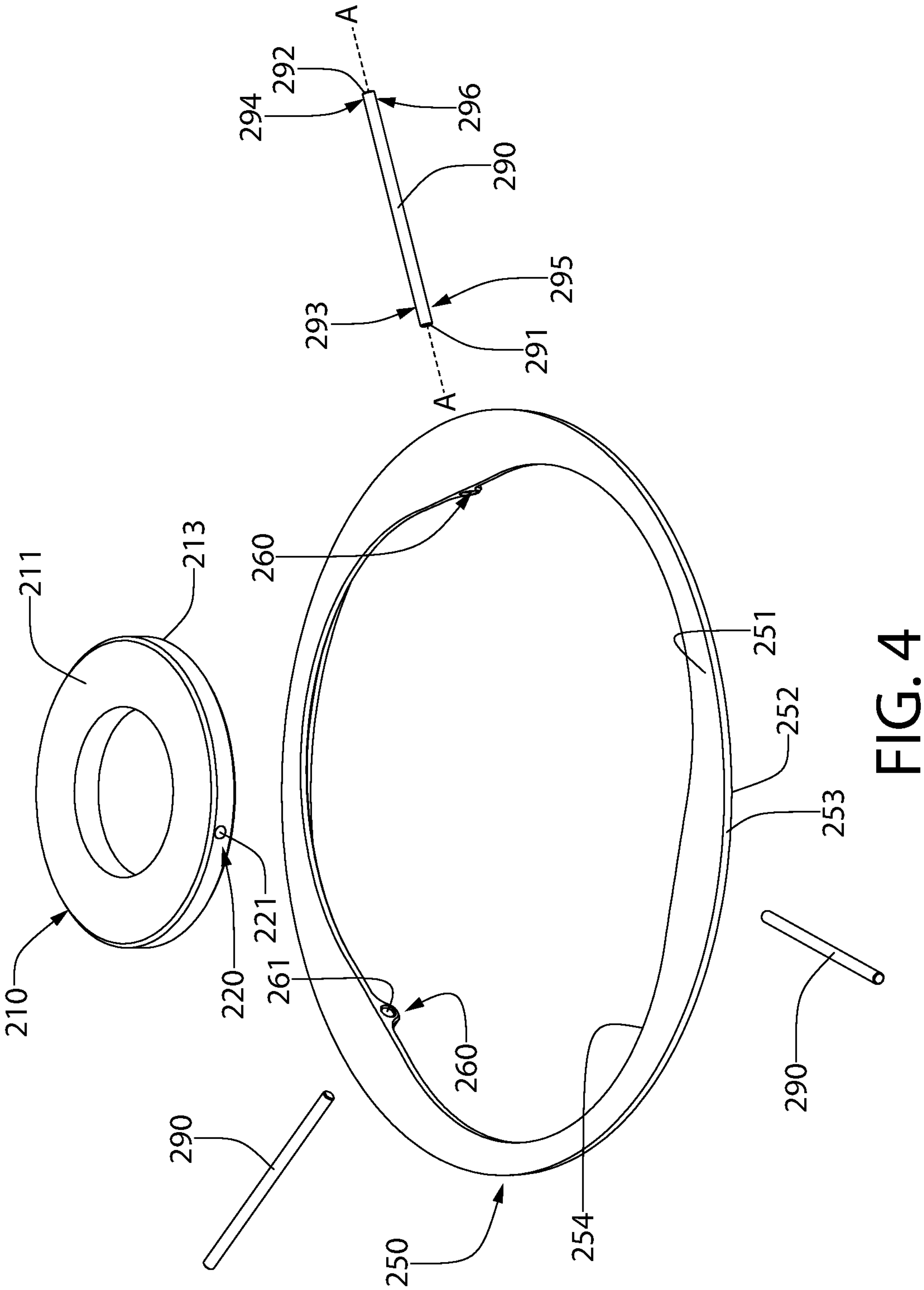
FIG. 4 is an exploded top perspective view of the ring assembly of FIG. 1.
Figure 5:
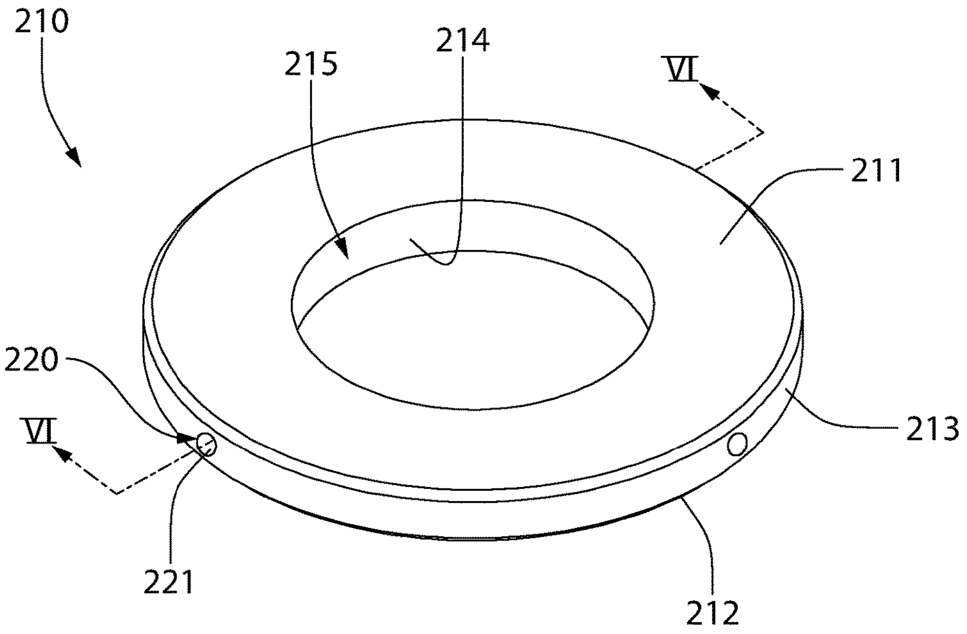
FIG. 5 is a top perspective view of a mounting hub of the ring assembly of FIG. 1.
Figure 6:
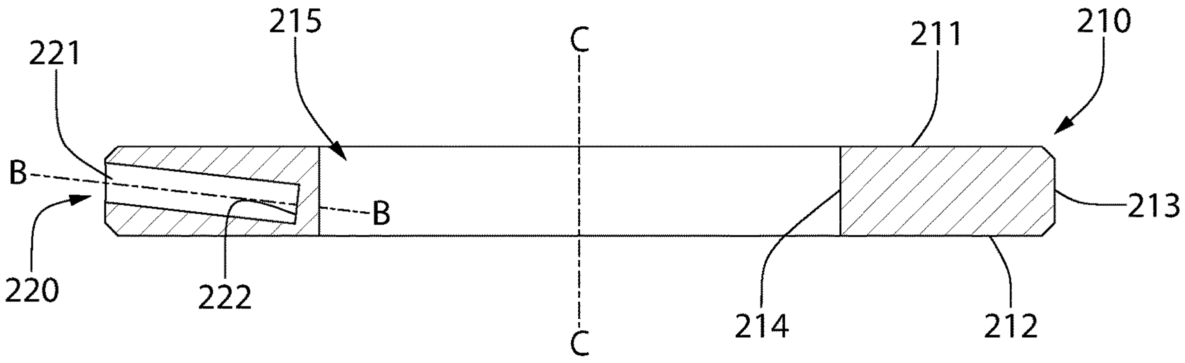
FIG. 6 is a cross-sectional view taken along line VI-VI of FIG. 5.
Figure 7:
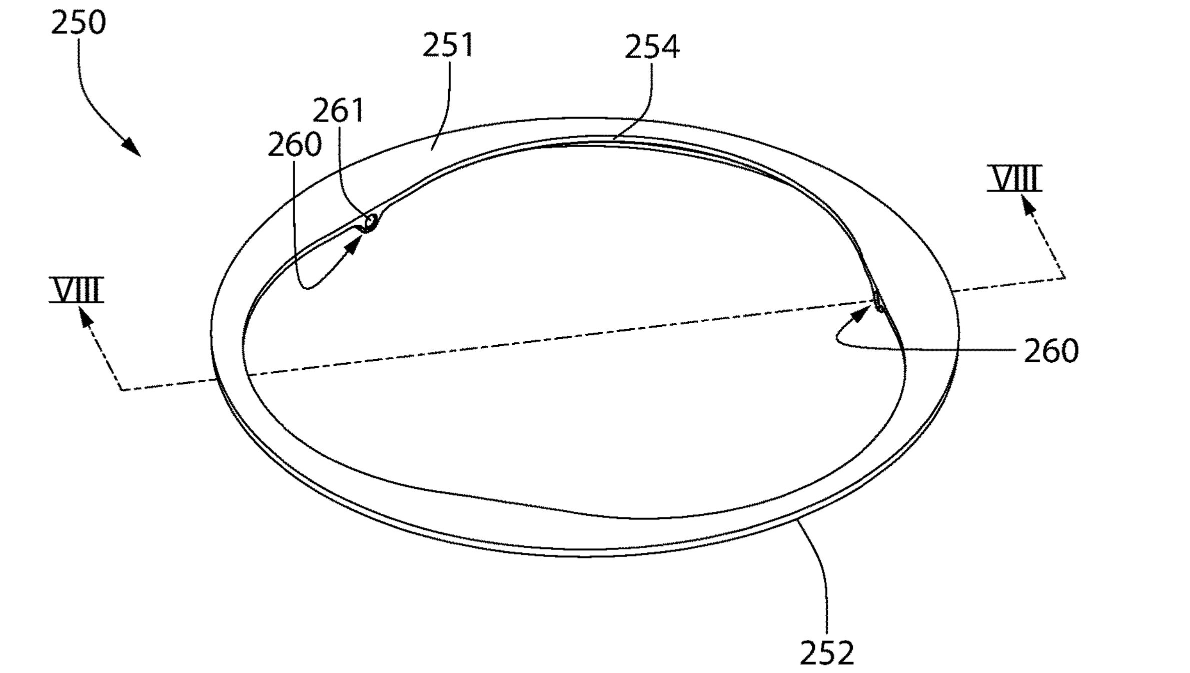
FIG. 7 is a top perspective view of an outer ring of the ring assembly of FIG. 1.
Figure 8:
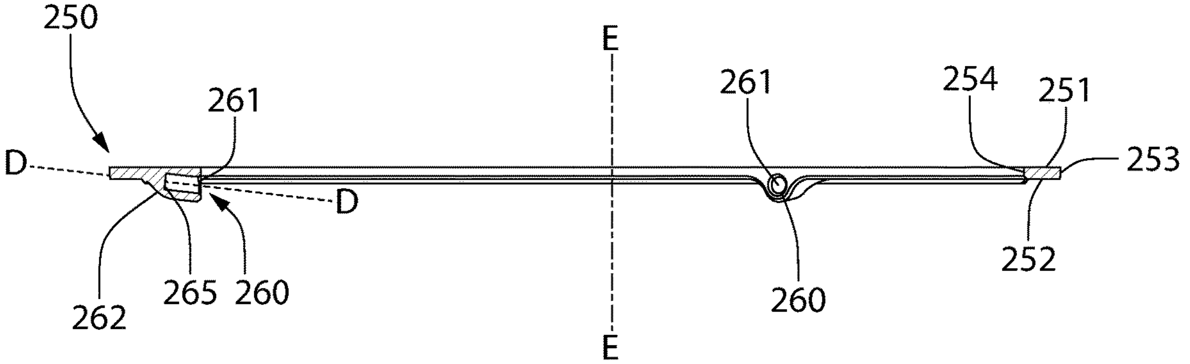
FIG. 8 is a cross-sectional view taken along line VIII-VIII of FIG. 7.

Referring to FIGS. 2-4 concurrently, the ring assembly 200 will be further described. The ring assembly 200 generally comprises a mounting hub 210, an outer ring 250, and a plurality of connectors 290. The mounting hub 210, the outer ring 250, and the plurality of connectors 290 may be separately formed components that are configured to be coupled together to form the ring assembly 200. In an embodiment, each of the mounting hub 210 and the outer ring 250 may be configured for detachable coupling to the plurality of connectors 290. Thus, the ring assembly 200 may be assembled by attaching the components together as described herein, and then the ring assembly 200 may be disassembled by separating the plurality of connectors 290 from each of the mounting hub 210 and the outer ring 250. The ring assembly 200 may be repeatably assembled and disassembled by manually attaching the connectors 290 to the mounting hub 210 and the outer ring 250 and manually detaching the connectors 290 from the mounting hub 210 and the outer ring 250.

The mounting hub 210 and the outer ring 250 may be fabricated via additive manufacturing methods, which may include Fused Filament Deposition (FDM), Selective Laser Sintering (SLS), Powder Bed Fusion (PBF), Stereolithography (SLA), among other commercially viable techniques. Other techniques for forming the mounting hub 210 and the outer ring 250 may also be used, including, for example without limitation, injection molding. The mounting hub 210 and the outer ring 250 may be formed from different thermoplastics, including polylactic acid (PLA), polyethylene terephthalate glycol (PETG), acrylonitrile butadiene styrene (ABS), polypropylene, polyethylene, among others, including photopolymer resins used in SLA processes. Other materials may be used for the mounting hub 210 and the outer ring 250 in alternative embodiments. For example, the mounting hub 210 and the outer ring 250 may be made from a thermoset material. In other embodiments, the mounting hub 210 and the outer ring 250 may be machined from aluminum or steel.

The connectors 290 may be formed from a rigid material. The connectors 290 may be formed from metal, such as steel, aluminum, or brass. Alternatively, the connectors 290 may be formed from plastic, wood, or other rigid materials that will enable the connectors 290 to be coupled to the mounting hub 210 and the outer ring 250 as described herein. In the exemplified embodiment, the ring assembly 200 comprises three of the connectors 290. However, the invention is not to be so limited in all embodiments and in some alternative embodiments there may be only two of the connectors 290 or there may be greater than three of the connectors 290.

In the exemplified embodiment, the connectors 290 are elongated rod-like members that extend from a first end 291 to a second end 292 along a longitudinal axis A-A. The connectors 290 comprise a first end portion 293 which comprises the first end 291 and a second end portion 294 which comprises the second end 292. Furthermore, each of the connectors 290 comprises a third mourning element 295 and a fourth mounting element 296. In the exemplified embodiment, the first end portion 293 of the connector 290 forms the third mounting element 295 and the second end portion 294 of the connector 290 forms the fourth mounting element 296. That is, the end portions of the connector 290 forms the third and fourth mounting elements 295, 296 that are configured to mate and/or interact with mounting elements of the mounting hub 210 and the outer ring 250 (described below) to facilitate the attachment of the connectors 290 to the mounting hub 210 and the outer ring 250. Alternative structures for the third and fourth mounting elements 295, 296 are possible, some examples of which will be provided in the description below. As an example, the first and second end portions 293, 294 may comprise cavities that form the third and fourth mounting elements.

Figure 14:
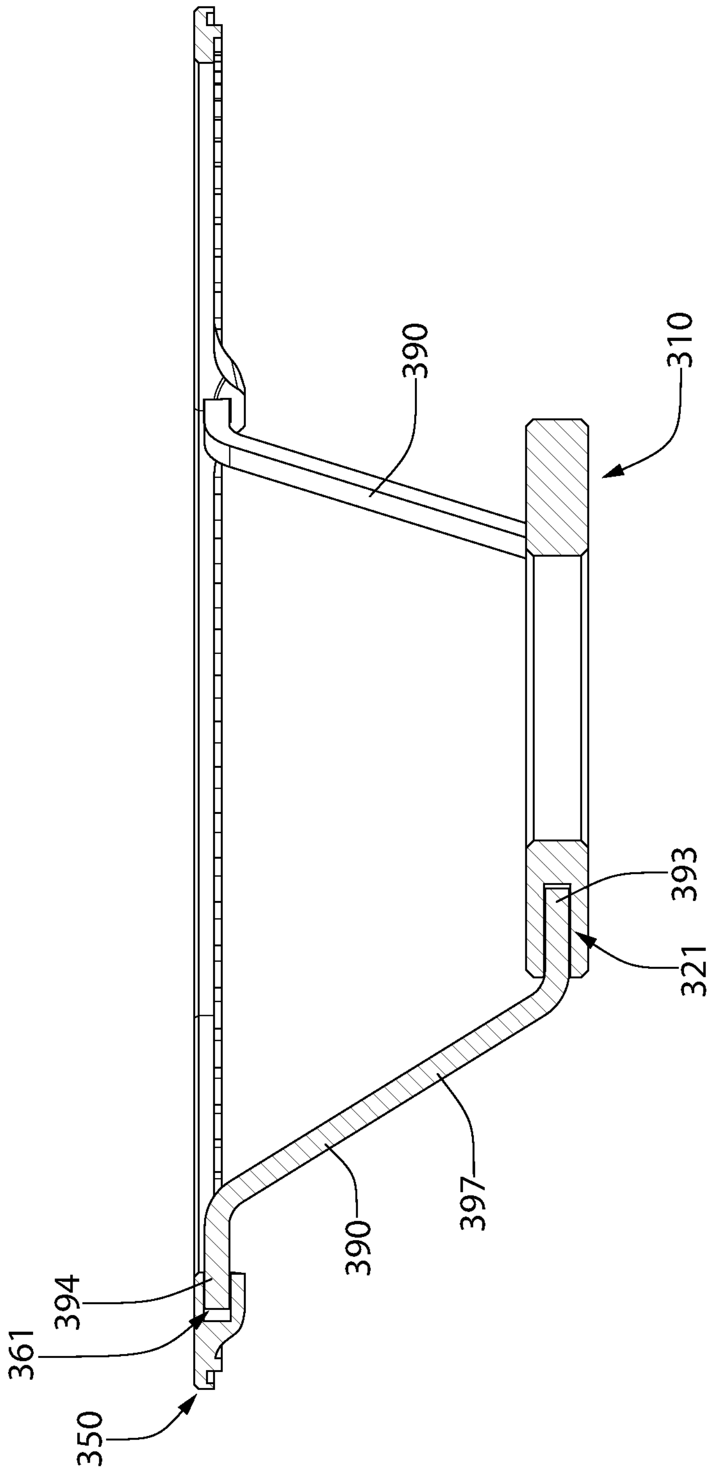
FIG. 14 is a cross-sectional view taken along line XIV-XIV of FIG. 12

In the exemplified embodiment, the connectors 290 are elongated along the longitudinal axis A-A so that the longitudinal axis A-A intersects both of the first and second ends 291, 292 of the connectors 290. The connectors 290 may have other shapes in other embodiments. For example, the connectors 290 may have central portions and end portions, with the end portions being angled or offset relative to the central portions. This configuration may be used to facilitate an attachment of the connectors 290 to the mounting hub 210 and to the outer ring 250 in an axial offset arrangement. Furthermore, in the exemplified embodiment the connectors 290 have a circular cross-sectional shape. However, the invention is not to be so limited and the connectors 290 may have other cross-sectional shapes, including square, hexagonal, other polygonal shapes, or the like. The cross-sectional shape of the connectors 290 may match with the cross-sectional shape of an aperture of the mounting hub 210 and the outer ring 250 within which the connector 290 is configured to be disposed, as discussed below. An example of a modified connector in accordance with this variation is shown in FIG. 14, described further below.

In an embodiment, the connectors 290 are formed as distinct and separate parts from each of the mounting hub 210 and the outer ring 250. In some embodiments, the connectors 290 may be formed from a first material and the mounting hub 210 and the outer ring 250 may be formed from a second material. The first material may be metal and the second material may be plastic. Alternatively, the first material may be wood and the second material may be plastic. The connectors 290 may be configured to be manually attached to the mounting hub 210 and to the outer ring 250 by a user without any tools other than the user's hands. The connectors 290 may be configured to be manually detached from the mounting hub 210 and to the outer ring 250 to disassemble the ring assembly 200. This attaching and detaching may be repeatable and may be achieved over and over manually by a user without the user of any tools.

Referring to FIGS. 2-6, the mounting hub 210 will be described. The mounting hub 210 may have a top surface 211, a bottom surface 212, and an outer surface (or outer edge) 213 that extends between the top and bottom surfaces 211, 212. The mounting hub 210 may further comprise a mounting hole 215 extending from the top surface 211 to the bottom surface 212. The mounting hole 215 may form an opening that extends through the full thickness of the mounting hub 210 from the top surface 211 to the bottom surface 212. The mounting hole 215 may be configured to receive a fastener or an attachment component of a light fixture to facilitate the attachment of the mounting hub 210 (and more generally, the ring assembly 200) to the light fixture. This will be described in greater detail below with reference to FIGS. 19-27. The mounting hub 210 comprises an inner surface 214 that is opposite the outer surface 212, with the inner surface 214 bounding or defining the mounting hole 215.

In the exemplified embodiment, the mounting hub 210 has a donut-like or ring-like shape. It should be appreciated that the specific shape of the mounting hub 210 could be modified in other embodiments. In the exemplified embodiment, the outer surface 213 of the mounting hub 210 defines a circle and the inner surface 214 of the mounting hub 210 defines a circle. However, the shape formed/defined by the inner and outer surfaces 213, 214 may be non-circular in other embodiments, including being polygonal (square, rectangular, hexagonal, octagonal, or the like), irregular, or other shapes. Furthermore, the inner and outer surfaces 213, 214 need not define the same shape in all embodiments. In some embodiments, the outer surface 213 may be circular and the inner surface 214 may be non-circular (square, rectangular, triangular, etc.). In other embodiments, the outer surface 213 may be non-circular and the inner surface 214 may be circular. In other embodiments, neither the outer surface 213 nor the inner surfaces 213 is circular. Thus, variations to the shape of the mounting hub 21 are possible, so long as the mounting hub 210 remains configured for coupling to a mounting portion of a light fixture as described herein.

The mounting hub 210 comprises a plurality of first mounting elements 220. In the exemplified embodiment, each of the first mounting elements 220 is an aperture 221 formed into the outer surface 213 of the mounting hub 210. The apertures 221 may have a cross-sectional shape that matches with the cross-sectional shape of the connectors 290 so that the connectors 290 may be at least partially received within the apertures 221. Thus, if the connectors 290 have a circular cross-sectional shape, the apertures 221 may also have a circular cross-sectional shape. If the connectors 290 have a polygonal (triangular, square, hexagonal, etc.) cross-sectional shape, the apertures 221 may have a matching polygonal cross-sectional shape. The apertures 221 may be referred to herein as hub apertures. Each of the apertures 221 may be a blind hole type aperture that extends from the outer surface 213 of the mounting hub 210 to a floor 222. Thus, in the exemplified embodiment the apertures 221 do not extend fully through from the outer surface 213 to the inner surface 214. In other embodiments, the apertures 221 may be through-holes that extend from the outer surface 213 to the inner surface 214. For example, the apertures 221 may be through-holes with a taper or step-down to help constrain the connectors when coupled thereto. The apertures 221 may be arranged along the outer surface 213 of the mounting hub 210 in a circumferentially spaced apart manner. In the exemplified embodiment, there are three of the apertures 221. The number of apertures 221 may match the number of the connectors 290, and thus there may be two apertures 221 or more than three apertures 211 in alternative embodiments. There may be more apertures 221 than there are connectors 290 in some embodiments.

While the first mounting elements 220 are depicted as apertures 221 in the exemplified embodiment, in other embodiments the first mounting elements 220 may be protuberances or posts or other structural features. Thus, for example, the first end 291 of the connectors 290 may define a cavity or recess (which therefore forms the third mounting element 295), and the first mounting elements 220 may comprise a post or protuberance that is configured to nest within the cavity or recess of the connector 290 to facilitate the attachment between the connectors 290 and the mounting hub 210.

The aperture 221 may extend along an aperture axis B-B. Furthermore, a vertical axis C-C may extend perpendicularly relative to the top and bottom surfaces 211, 212 of the mounting hub 210. The aperture axis B-B may be oblique to the vertical axis C-C. In the exemplified embodiment, the aperture axis B-B is acute to the vertical axis C-C. The aperture axis B-B may extend at an upward angle as it moves from the floor 222 to the outer surface 213. The aperture axis B-B may extend at different angles relative to the vertical axis C-C in different embodiments, depending at least on part on the shape and structure of the connectors 290 and the desired axial offset distance between the mounting hub 210 and the outer ring 250 when coupled together by the connectors 290. In the exemplified embodiment there are three of the apertures 221 and they are equidistantly spaced apart along the outer surface 213 of the mounting hub 210. The apertures 221 may be spaced apart by 120° in some embodiments. The number of the apertures 221 may dictate the spacing, which may be equidistant as noted, although this is not required in all embodiments.

While the first mounting elements 220 (i.e., the apertures 221) are located along the outer surface 213 of the mounting hub 210 in the exemplified embodiment, the invention is not to be so limited in all embodiments. In an alternative embodiment, the first mounting elements 220 (i.e., the apertures 221) may be formed into the bottom surface 212 of the mounting hub 210. In another alternative embodiment, the first mounting elements 220 (i.e., the apertures 221) may be formed into the top surface 211 of the mounting hub 210.

Referring now to FIGS. 2-4, 7, and 8, the outer ring 250 will be described. The outer ring 250 comprises a top surface 251, a bottom surface 252, an outer surface 253 that extends between the top and bottom surfaces 251, 252, and an inner surface 254 that extends between the top and bottom surfaces 251, 252. The outer ring 250 is a ring-shaped component and thus the inner surface 254 bounds or defines a through-hole that extends in the direction between the top and bottom surfaces 251, 252 of the outer ring 250. Although the outer ring 250 is described as being ring-shaped, the inner and outer surfaces 251, 252 need not be circular, but may have other shapes, including irregular shapes, shapes with various concave, flat, and convex portions, wavy shapes, polygonal shapes, or the like. Furthermore, the outer ring 250 is configured to be coupled to the top or bottom edge or some other part of a lampshade. Thus, the shape of the outer ring 250 may be modified as needed to match the shape of a top or bottom edge of a lampshade. For example, if the lampshade has a corrugated shape with alternating ridges and grooves, the outer surface 253 may have a similar matching corrugated shape to facilitate a seamless attachment of the outer ring 250 to the lampshade.

The outer ring 250 may comprise a plurality of second mounting elements 260. The second mounting elements 260 may be located along the inner surface 254 of the outer ring 250 and may be arranged in a spaced apart manner. In the exemplified embodiment each of the second mounting elements 260 is an aperture 261 formed into the inner surface 254 of the outer ring 250. The apertures 261 may be referred to herein as ring apertures. In the exemplified embodiment, the apertures 261 are blind holes that extend from the inner surface 254 of the outer ring 250 to a floor 265. Furthermore, the apertures 261 extend along an axis D-D that is oriented obliquely relative to a vertical axis E-E. The apertures 261 may extend downwardly when moving from the floor 265 towards the inner surface 254. The apertures 261 may intersect the vertical axis E-E at an acute angle. The specific angle of the apertures 261 may be modified as needed depending on the shape and structure of the connectors 290 and the desired relative positioning of the outer ring 250 and the mounting hub 210.

While the second mounting elements 260 are depicted as apertures 261 in the exemplified embodiment, in other embodiments the second mounting elements 260 may be protuberances or posts or other structural features. Thus, for example, the second end 292 of the connectors 290 may define a cavity or recess (which therefore forms the fourth mounting element 296), and the second mounting elements 260 may comprise a post or protuberance that is configured to nest within the cavity or recess of the connector 290 to facilitate the attachment between the connectors 290 and the outer ring 250.

In the exemplified embodiment, there are three of the apertures 261. There may be fewer or greater than three apertures 261 in other embodiments. In some embodiments, the number of apertures 261 matches the number of connectors 290 and the number of apertures 221, although this is not required in all embodiments. In the exemplified embodiment with three of the apertures 261, the apertures may be spaced 120° apart along the inner surface 254 of the outer ring 250. The apertures 261 may be equidistantly spaced apart along the inner surface 254 of the outer ring 250, although equidistant spacing is not required in all embodiments.

In the exemplified embodiment, the outer ring 250 is rather thin measured in the direction between the top and bottom surfaces 251, 252. For example, the thickness of the outer ring 250 between the top and bottom surfaces 251, 252 may be smaller than a diameter of the connectors 290. The outer ring 250 may be between 0.5 mm and 6.0 mm thick, more specifically between 1 mm and 5 mm, or between 2 mm and 4 mm thick, for example. In some embodiments, may be desirable to form the outer ring 250 with a small thickness (in the 0.5 mm to 3.0 mm range, for example) in order to render the outer ring 250 flexible. That is, a user may be able to manipulate and bend the outer ring 250 without breaking the outer ring 250 to facilitate the attachment of the outer ring 250 with the connectors 290 after the connectors 290 are already coupled to the mounting hub 210. As such, the outer ring 250 may comprise an additional mounting structure 262 surrounding each of the apertures 261 to increase the thickness of the outer sing 250 at the location of the apertures 261. The mounting hub 210 may be thicker between the top and bottom surfaces 211, 212 than the outer ring 250.

While the second mounting elements 260 (i.e., the apertures 261) are located along the outer surface 553 of the outer ring 250 in the exemplified embodiment, the invention is not to be so limited in all embodiments. In an alternative embodiment, the second mounting elements 260 (i.e., the apertures 261) may be formed into the bottom surface 252 of the outer ring 250. In another alternative embodiment, the second mounting elements 260 (i.e., the apertures 261) may be formed into the top surface 251 of the outer ring 250.

Referring sequentially to FIGS. 9A-9F, the assembly of the ring assembly 200 from the separate and distinct mounting hub 210, outer ring 250, and connectors 290 will be described. First, referring to FIGS. 9A and 9B, the connectors 290 are coupled to the mounting hub 210. In the exemplified embodiment, this is achieved by inserting the first end portion 293 of each of the connectors 290 into one of the apertures 221 formed into the outer surface 213 of the mounting hub 210. This may be done manually by a user gripping the connectors 290 one by one and press-fitting them into one of the apertures 221. The first end portions 293 of the connectors 290 may fit snugly within the aperture 221, and the connectors 290 may thereby be coupled to the mounting hub 210 by friction fit, interference fit, press fit, or the like. In some embodiments, if desired, an adhesive may be placed into the apertures 221 prior to inserting the first end portions 293 of the connectors 290 into the apertures 221 to fix the attachment between the connectors 290 and the mounting hub 210. In other embodiments, it may be preferable to maintain a detachable connection so that the connectors 290 may be removed from the apertures 221 and detached from the mounting hub 210 to disassemble the ring assembly 200 as needed. In such embodiments, no adhesive will be used in the connection between the connectors 290 and the mounting hub 210.

In the exemplified embodiment, the connectors 290 are detachably coupled to the mounting hub 210 via engagement between the third mounting element 295 of the connector 290 and the first mounting element 220 of the mounting hub 220. In the exemplified embodiment, this requires inserting the first end portions 293 of the connectors 290 into the apertures 221 of the mounting hub 220. Furthermore, this may be accomplished manually by a user simply pressing the first end portions 293 of the connectors 290 into the apertures 221. In an alternative embodiment, the first mounting elements 220 of the mounting hub 220 may comprise protrusions or posts and the third mounting element 295 of the connectors 290 may comprise an opening formed into the first end 291 of the connector 290. In such an embodiment, the connectors 290 would be coupled to the mounting hub 210 in a similar press-fit manner, except that the opening of the connectors 290 would receive the protrusion or post of the mounting hub 220 to facilitate the attachment. In both situations, the connectors 290 may be detachably coupled to the mounting hub 220. After the connectors 290 are coupled to the mounting hub 220, the connectors 290 extend radially from the outer surface 213 of the mounting hub 220 to the second ends 292 of the connectors 290.

Figure 9A:
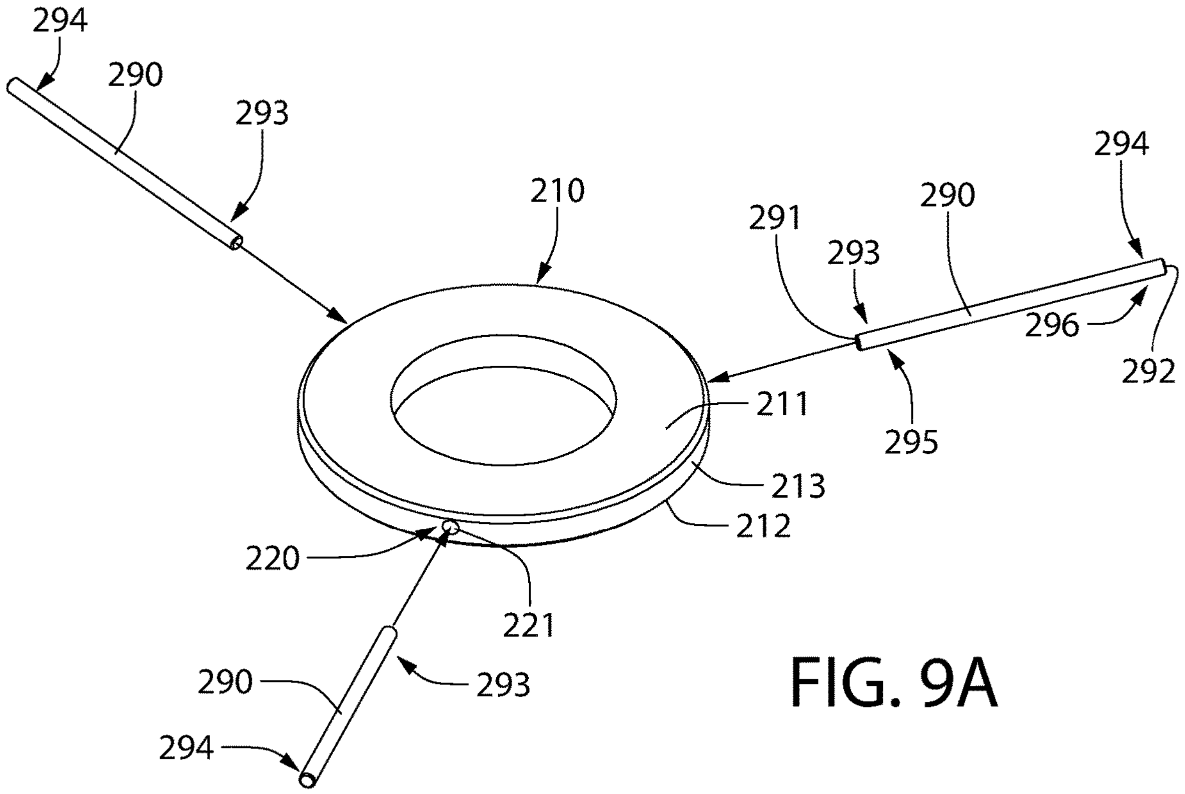
FIGS. 9A-9F are sequential illustrations showing the assembly of the ring assembly from the mounting hub, the outer ring, and a plurality of connectors.
Figure 9B:
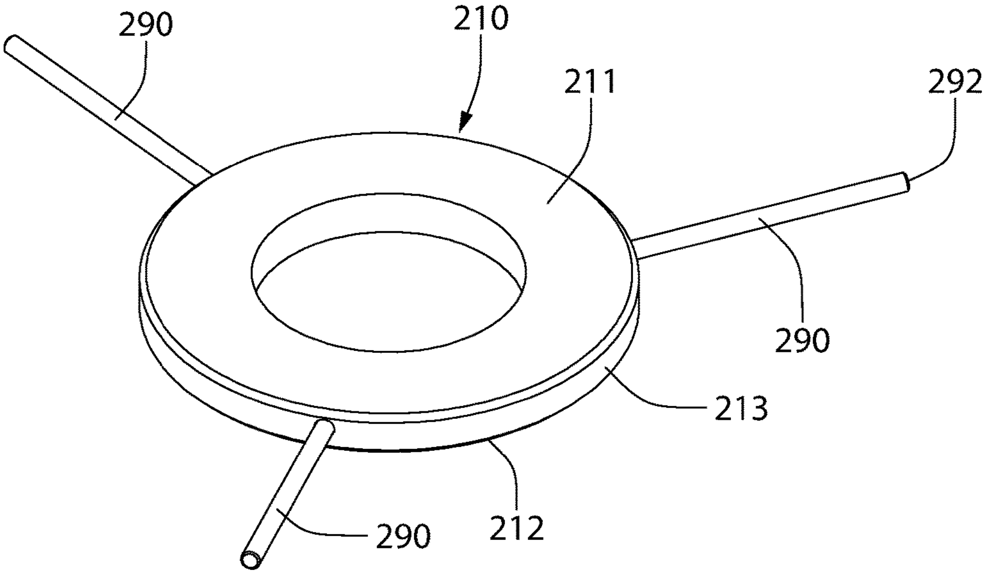
Figure 9C:
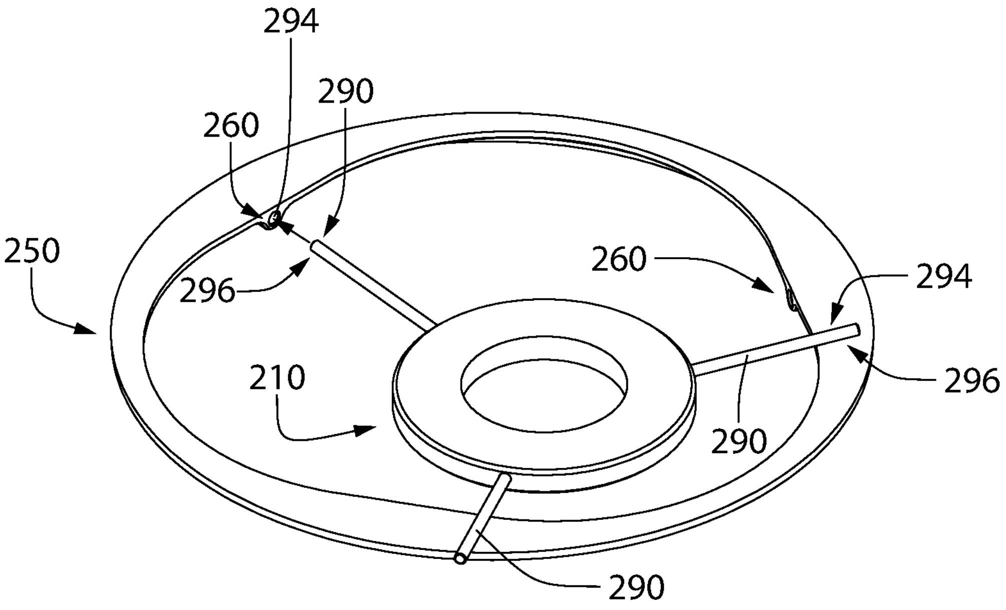
Figure 9D:
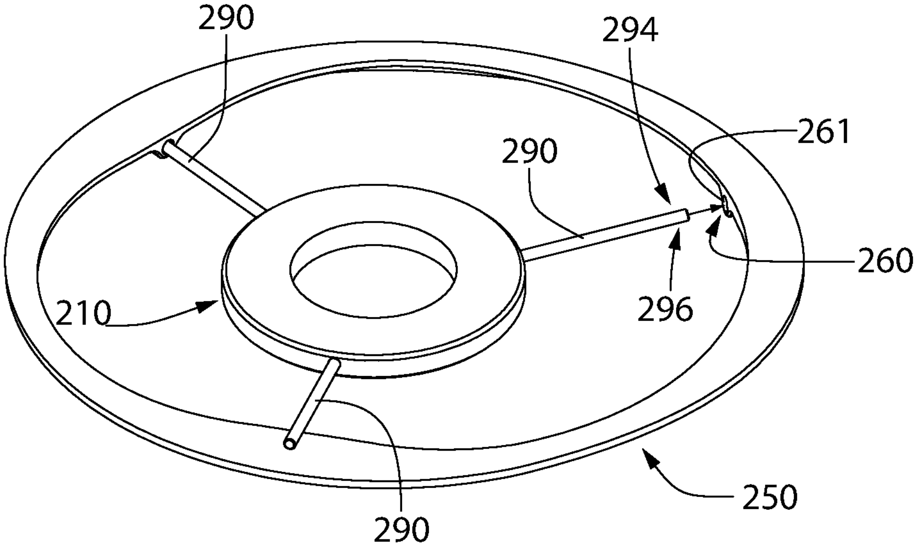
Figure 9E:
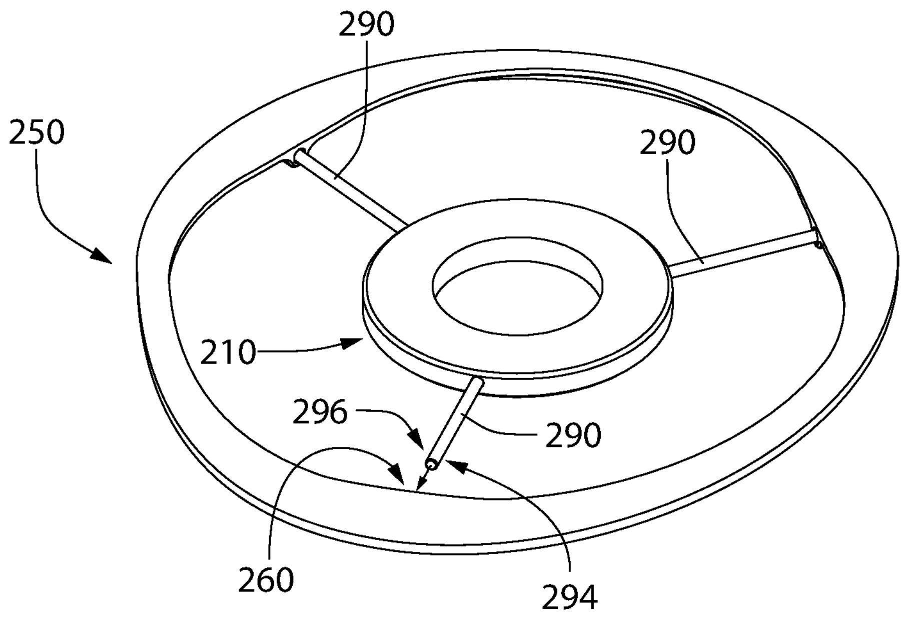
Figure 9F:
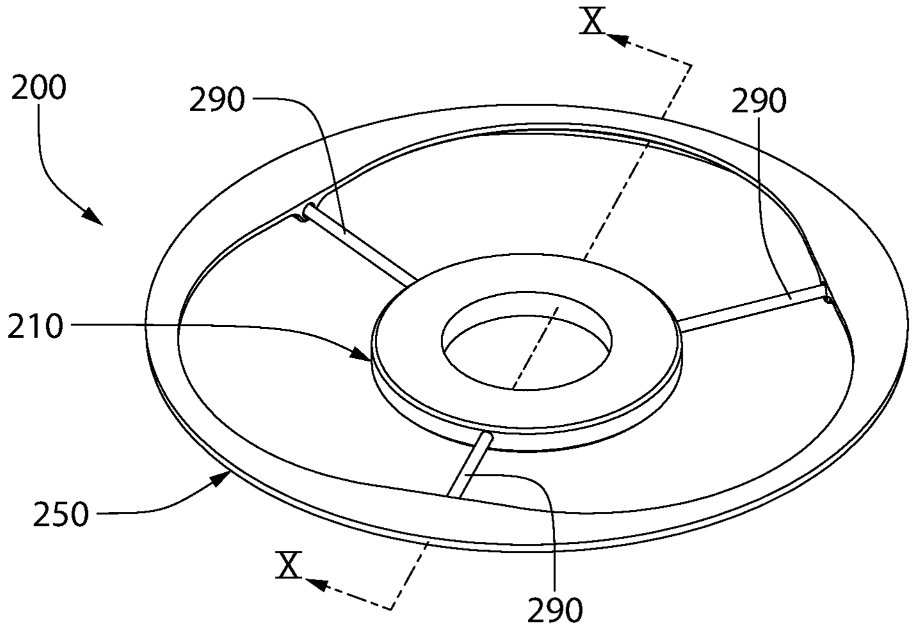

Next, referring to FIGS. 9C-9F, the connectors 290 are coupled to the outer ring 250. The second ends 292 of the connectors 290 may be tangent to a reference ring that has a diameter that is greater than an interior diameter of the outer ring 250. As such, the outer ring 250 must be bent, flexed, and manipulated to enable the connectors 290 to engage with the various second mounting elements 260 of the outer ring 250. FIGS. 9C and 9D illustrate one of the connectors 290 being aligned with one of the second mounting elements 260 (i.e., apertures 261) and then the second end portion 294 of the connector 290 (which forms the fourth mounting element 296 of the connector 290) is inserted into the aperture 261. This is then repeated for each of the connectors 290 until the second end portions 294 of each of the connectors 290 nests within one of the apertures 261 of the outer ring 250. Again, the flexibility of the outer ring 250 may allow the outer ring 250 to be bent, flexed, and manipulated to allow for the connectors 290 to be inserted into the apertures 261 one by one, as shown in the drawings. Each of the connectors 290 is coupled to the outer ring 250 via engagement between the fourth mounting element 296 of the connector 290 (formed by the second end portion 294 of the connector 290) and one of the second mounting elements 260 (i.e., apertures 261) of the outer ring 290.

The connectors 290 may be fixedly coupled to the outer ring 250 with an adhesive. However, it may be preferred to not use an adhesive so that the connectors 290 may be later separated from the outer ring 250 so that the ring assembly 200 can be disassembled. The assembly and disassembly of the ring assembly 200 may be achieved entirely manually by a user without any tools required.

Figure 10:
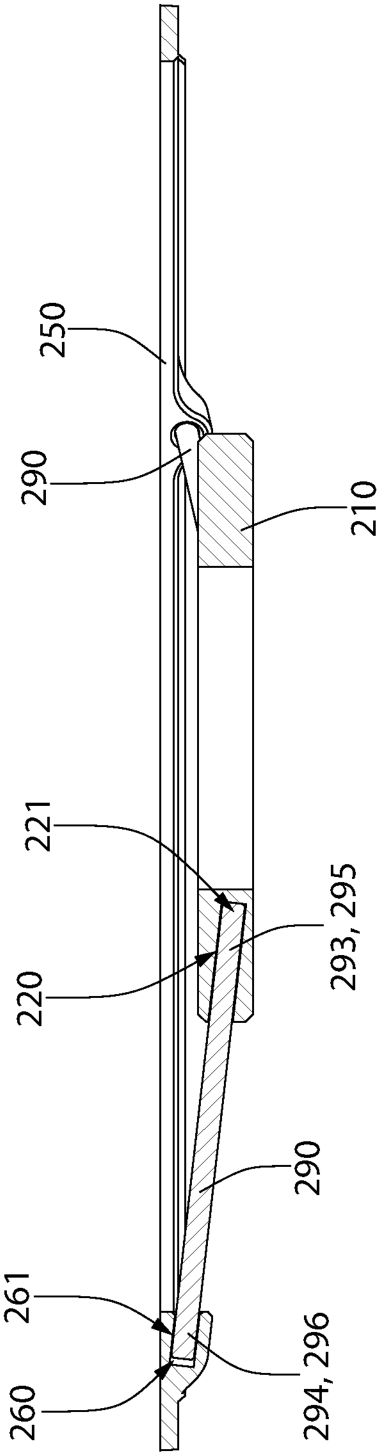
FIG. 10 is a cross-sectional view taken along line X-X of FIG. 9F.

FIG. 10 is a cross-sectional view taken through the ring assembly 200 along one of the connectors 290. This view provides an illustration of the third mounting element 295 of the connector 290 engaged with the first mounting element 220 of the mounting hub 210 and the fourth mounting element 296 of the connector 290 engaged with the second mounting element 260 of the outer ring 250. More specifically, this illustrates the first end portion 293 of the connector 290 nesting or disposed within the aperture 221 of the mounting hub 210 while the second end portion 294 of the connector 290 nests or is disposed within the aperture 261 of the outer ring 250. The material selection and tolerance of parts (i.e., the tight fit between the connectors 290 and the apertures 221, 261) enables the connectors 290 to remain coupled to the mounting hub 210 and to the outer ring 250 throughout the life cycle of the lampshade apparatus.

Thus, the mounting hub 210 and the outer ring 210 are coupled together via the connectors 290. As noted above, inserting the first and second end portions 293, 294 of the connectors 290 into apertures in the mounting hub 210 and the outer ring 250 is one technique for forming the ring assembly 200. In alternative embodiments, posts of the mounting hub 210 and outer ring 250 may be inserted into holes in the ends of the connectors 290. Other techniques for detachably coupling the connectors 290 to the mounting hub 210 and to the outer ring 250 may be used in further alternative embodiments. Each of the connectors 290 may extend linearly and radially from the outer surface 213 of the mounting hub 210 to the inner surface 254 of the outer ring 250. Each of the apertures 221 (or first mounting elements 220) of the mounting hub 220 may be radially aligned with one of the apertures 261 (or second mounting elements 260) of the outer ring 250.

Figure 11:
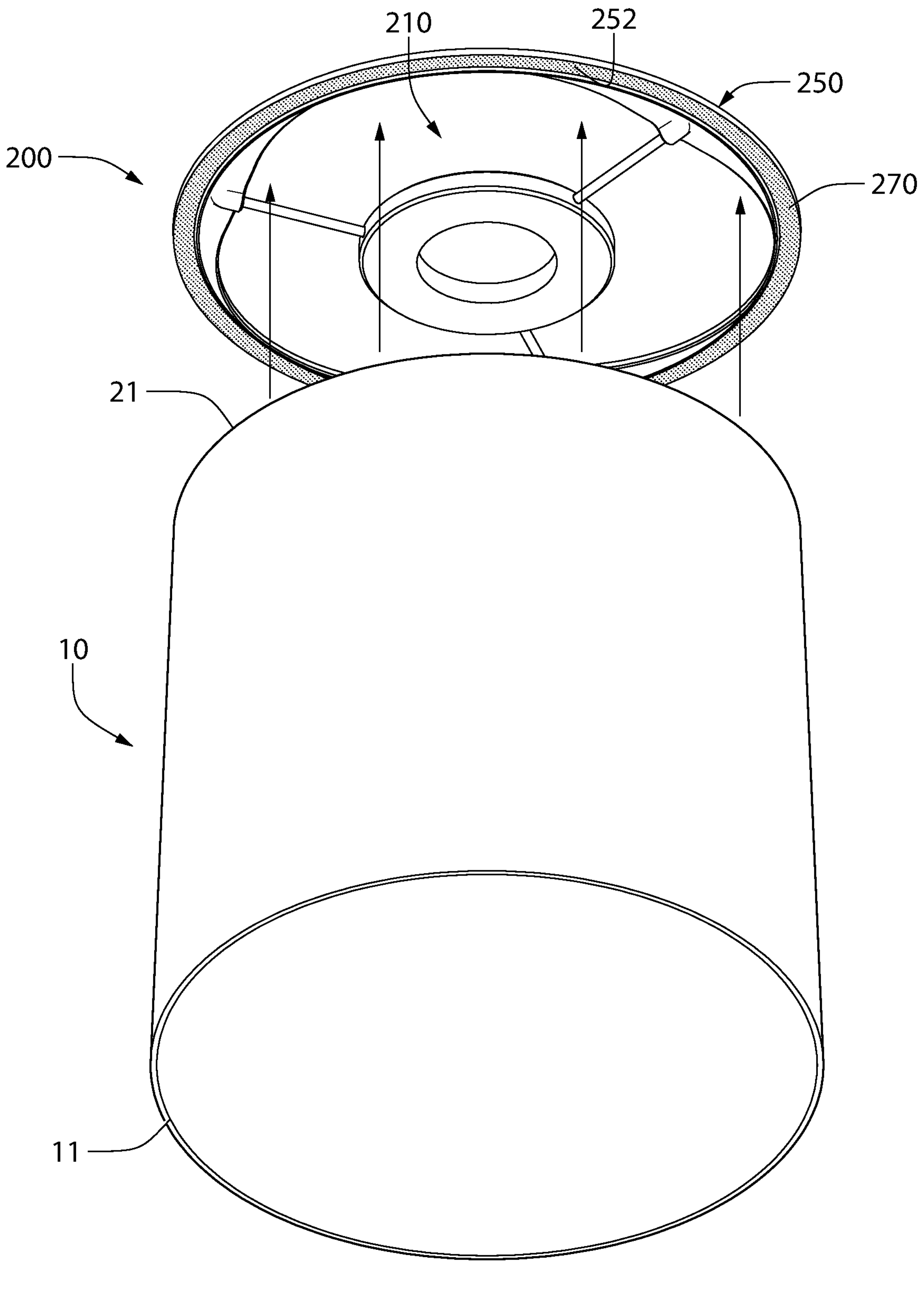
FIG. 11 illustrates the attachment of the ring assembly of FIG. 1 to the lampshade of FIG. 1.

Referring to FIG. 11, after the ring assembly 200 is formed, the ring assembly 200 may be coupled to the lampshade 10. This may be achieved by placing the bottom surface 252 of the outer ring 250 into engagement with the top edge 12 of the lampshade 10. In one embodiment, an adhesive 270 such as glue or epoxy or the like may first be placed onto the bottom surface 252 of the outer ring 250 or the top edge 12 of the lampshade 10, or both. Thus, when the bottom surface 252 is placed into contact with the top edge 12 of the lampshade 10, the ring assembly 200 may become attached to the lampshade 10. In other embodiments, other attachment techniques may be used, including 2-part epoxy, UV cure epoxy, laser beam welding, hot melt glue, threads, solvent bonding, or snap-fit mechanisms (e.g., the top edge 12 of the lampshade 10 may have an engagement feature that snap-fits with an engagement feature on the bottom surface 252 of the outer ring 250). Other techniques for attaching the two components together may also be used as would be appreciated by people of ordinary skill in the art. Moreover, while FIG. 11 illustrates the ring assembly 200 being coupled to the top edge 12 of the lampshade 10, in other embodiments the ring assembly 200 may be coupled to the bottom edge 11 of the lampshade 10. After the ring assembly 200 is coupled to the lampshade 10, the top plane of the outer ring 250 becomes static and it is no longer able to flex as described above. Thus, once the ring assembly 200 is coupled to the lampshade 10, the connectors 290 become locked into place between the mounting hub 210 and the outer ring 250. The ring assembly 200 can generally not become disassembled after it is attached to the lampshade 10 unless it is first detached from the lampshade 10.

Figure 12:
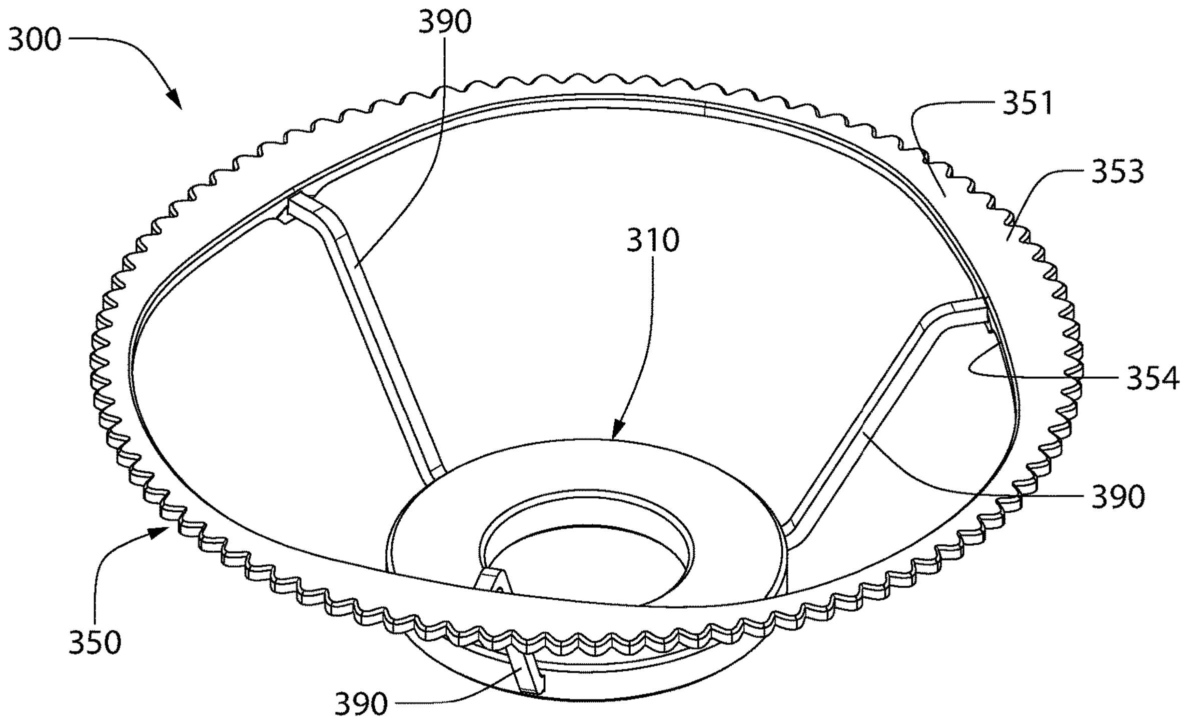
FIG. 12 is a top perspective view of a ring assembly in accordance with a first alternative embodiment.
Figure 13:
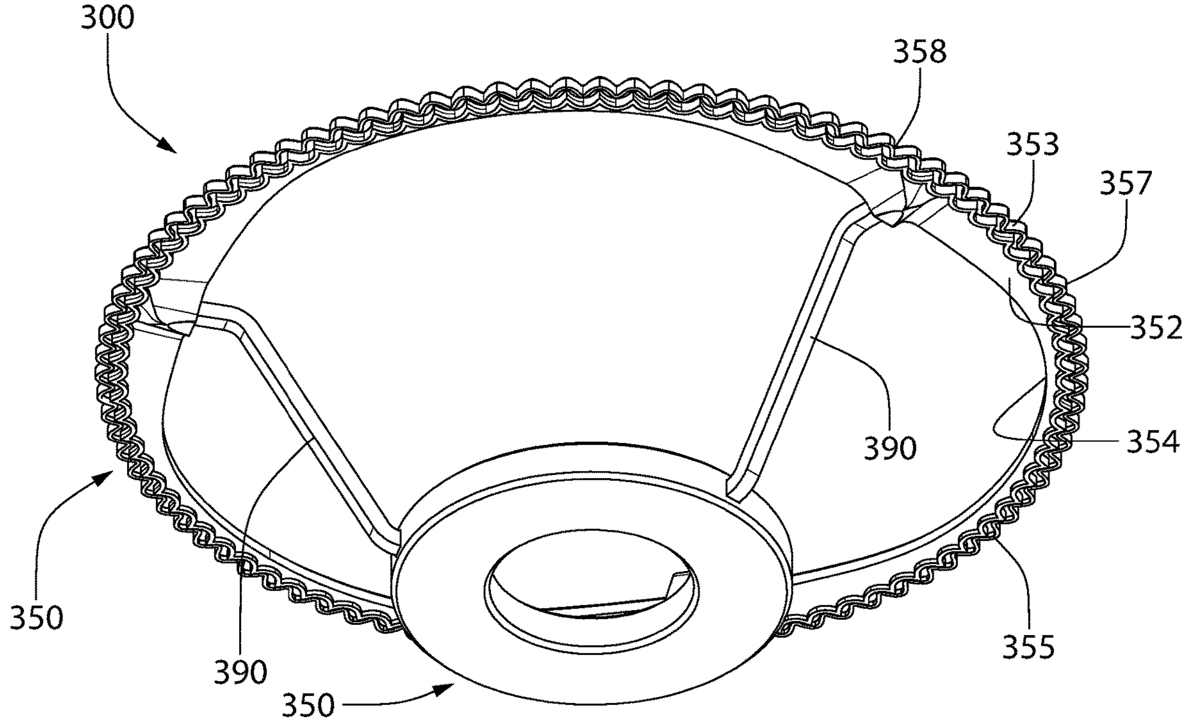
FIG. 13 is a bottom perspective view of the ring assembly of FIG. 12.

Referring to FIGS. 12-14, a ring assembly 300 is illustrated in accordance with an alternative embodiment of the present invention. The ring assembly 300 generally comprises a mounting hub 310, an outer ring 350, and a plurality of connectors 390. The mounting hub 310 is identical to the mounting hub 210, and thus the details of the mounting hub 210 are applicable. While the diameter of the mounting hole may vary between the different mounting hubs 210, 310, the concepts and features described herein are applicable to both of the mounting hubs 210, 310 unless otherwise specified herein.

In this embodiment, the connectors 390 comprise an elongated central portion 397, a first end portion 393, and a second end portion 394. The first and second end portions 393, 394 extend obliquely from the opposite ends of the elongated central portion 397. Thus, the connectors 390 have a Z-like shape. The first end portions 393 of the connectors 390 are configured to nest within apertures 321 formed into the mounting hub 310 and the second end portions 394 of the connectors 390 are configured to nest within apertures 361 formed into the outer ring 350. In this embodiment, the connectors 390 cause the mounting hub 310 and the outer ring 350 to be maintained axially offset relative to one another. That is, due to the shape of the connectors 390 and the orientation of the apertures 321, 361, when the ring assembly 300 is assembled, the outer ring 350 is maintained in vertically spaced relation relative to the mounting hub 310. The specific spacing distance between the outer ring 350 and the mounting hub 310 may be selected based on the style and specific details of the light fixture to which the ring assembly 300 is configured to be coupled. Some examples of this will be provided below with reference to FIGS. 19-27.

In this embodiment, the outer ring 350 comprises an outer surface 353 and an inner surface 354. The inner surface 354 is generally round and may be circular, although the invention is not to be so limited in all embodiments. The outer surface 353 is wavy such that the form of the outer surface 353 smoothly curves in and out forming alternating ridges and valleys. The outer surface 353 may be designed this way in order to correspond to the shape of the top or bottom edge or the outer surface of the lampshade to which the outer ring 350 is configured to be attached.

The outer ring 350 may comprise a top surface 351 and a bottom surface 352. The outer ring 350 may comprise an alignment feature 355 on the bottom surface 352. In the exemplified embodiment, the alignment feature 355 is an annular recess 356 defined in the bottom surface 352 of the outer ring 350. The annular recess 356 has a wavy (or scalloped) shape. A specific lampshade may be designed for use with the outer ring 350. In particular, a lampshade having a top edge or a top portion with a corresponding wavy edge geometry that mates with the annular recess 356 (and perhaps nests therein) may be used with the outer ring 350. This may facilitate a tight mating arrangement between the outer ring 350 of the ring assembly 300 and the lampshade to which it is coupled to help maintain the coupling therebetween once attached as described herein. The annular recess 356 is not limited to the wavy shape as shown, but could take on other shapes to match with specific lampshades and enhance the attachment.

In some embodiments, the outer surface 353 may comprise an upper edge portion 357 that is adjacent to the top surface 351 and a lower edge portion 358 that is adjacent to the bottom surface 352. The lower edge portion 358 may be recessed radially inward relative to the upper edge portion 357. Stated another way, the upper edge portion 357 may be formed on a flange that extends radially outward beyond the lower edge portion 358. The lower edge portion 358 may be configured to engage an interior surface of a lampshade while the flange rests atop the top edge of the lampshade and the upper edge portion 357 is flush with the outer surface of the lampshade. Thus, the edge geometry of the upper and/or lower edge portions 357, 358 may mate with the edge geometry or surface geometry of the lampshade to enhance alignment and attachment between the ring assembly 300 and the lampshade.

Figure 15:
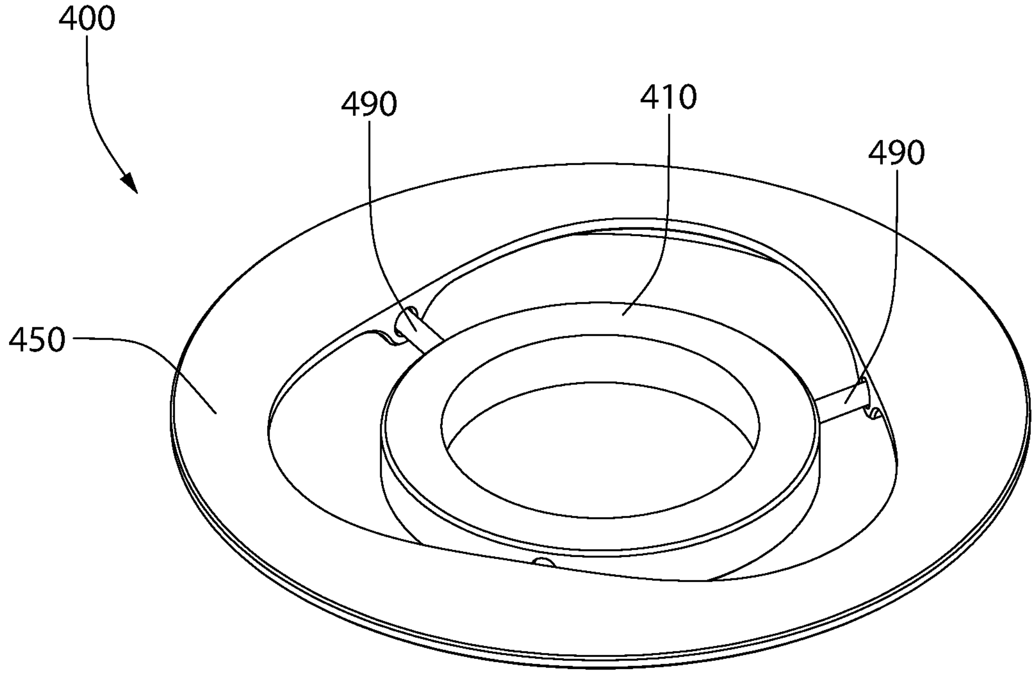
FIG. 15 is a top perspective view of a ring assembly in accordance with a second alternative embodiment.
Figure 16:
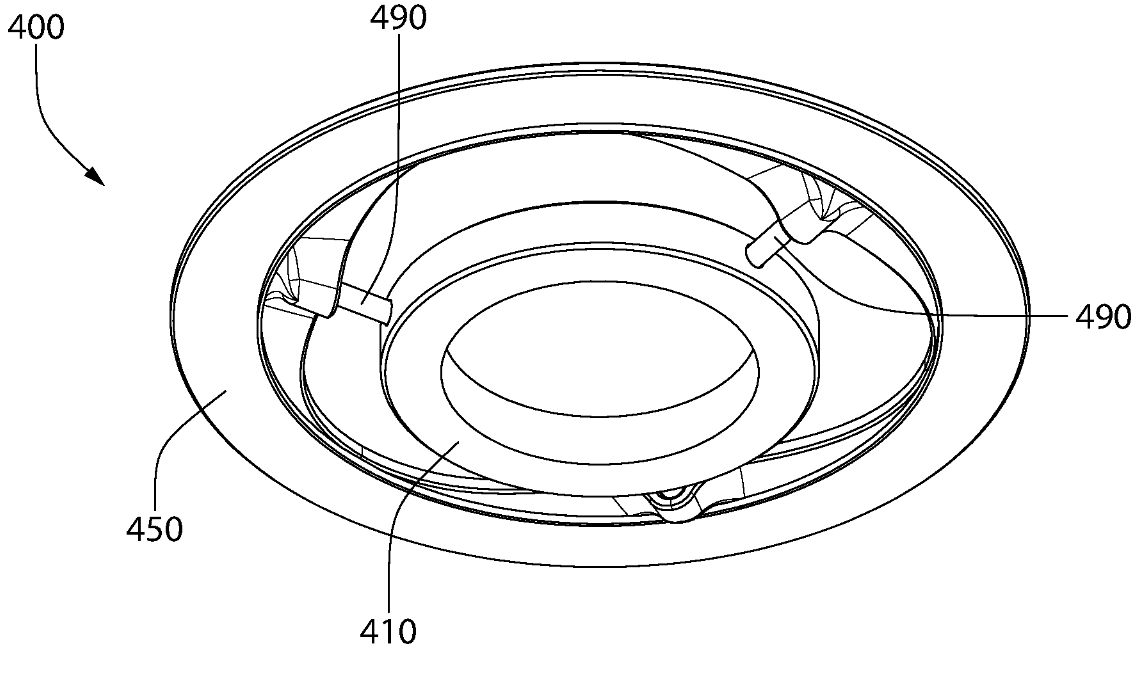
FIG. 16 is a bottom perspective view of the ring assembly of FIG. 15.
Figure 17:
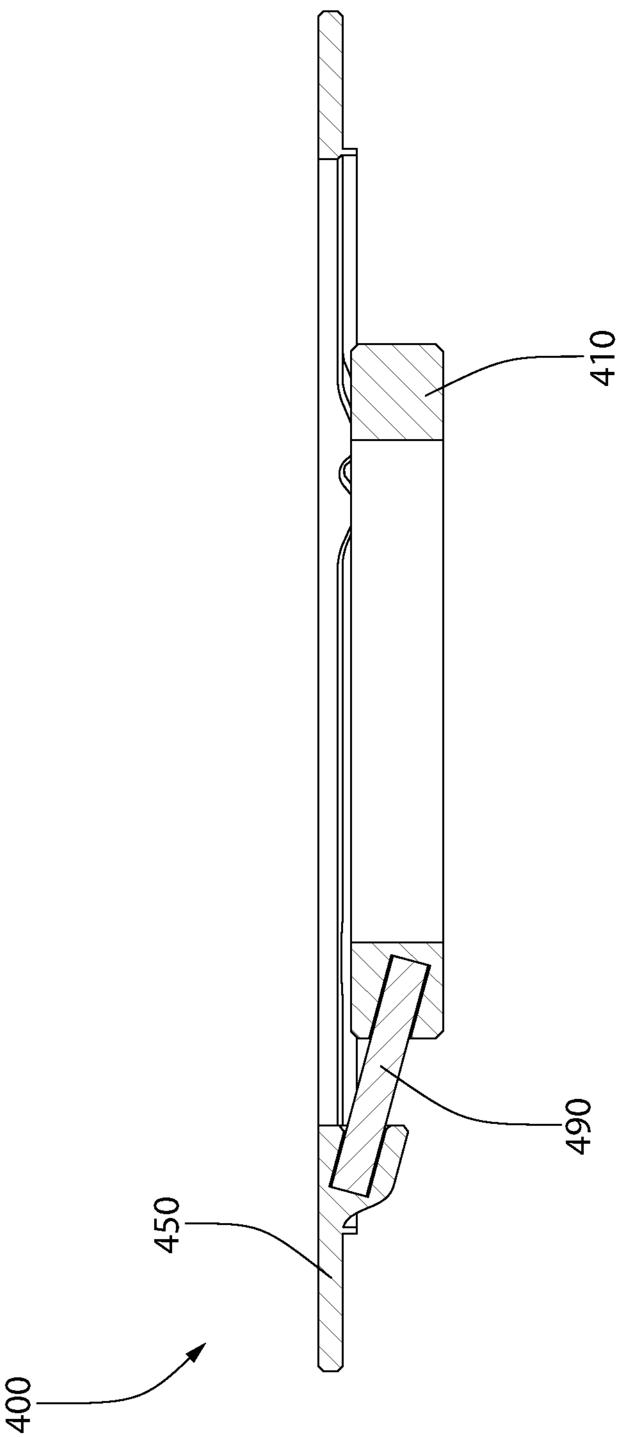
FIG. 17 is a cross-sectional view taken along line XVII-XVII of FIG. 15.

FIGS. 15-17 illustrate a ring assembly 400 in accordance with another embodiment. As with the previously described embodiments, the ring assembly 400 comprises a mounting hub 410, an outer ring 450, and a plurality of connectors 490 that are detachably coupled to the mounting hub 410 and to the outer ring 450. The concepts described above are fully applicable to the ring assembly 400, which will therefore not be described in any further detail in the interest of brevity. The ring assembly 400 merely illustrates an alternative structural configuration for the various components, including different thicknesses, different structural alignment features for mating with a lampshade, different size connectors, and the like.

Figure 18A:
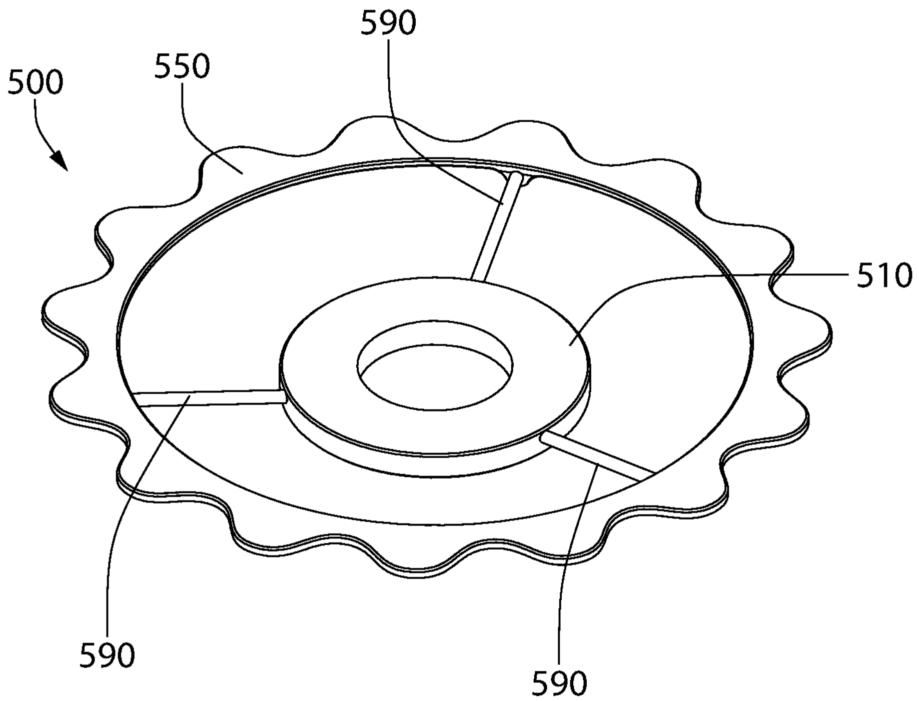
FIG. 18A is a top perspective view of a ring assembly in accordance with a third alternative embodiment.
Figure 18B:
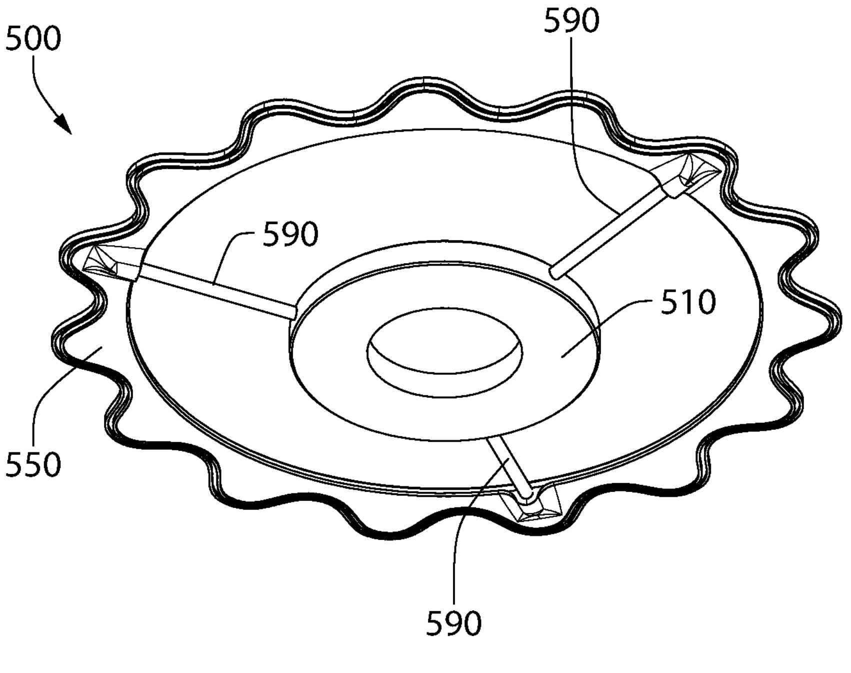
FIG. 18B is a bottom perspective view of the ring assembly of FIG. 18A.

FIGS. 18A and 18B illustrate a ring assembly 500 in accordance with still another embodiment. As with the previously described embodiments, the ring assembly 500 comprises a mounting hub 510, an outer ring 550, and a plurality of connectors 590 that are detachably coupled to the mounting hub 510 and to the outer ring 550. The concepts described above are fully applicable to the ring assembly 500, which will therefore not be described in any further detail in the interest of brevity. The ring assembly 500 merely illustrates an alternative structural configuration for the various components, including different thicknesses, different structural alignment features for mating with a lampshade, different exterior edge profiles, different size connectors, and the like.

Figure 19:
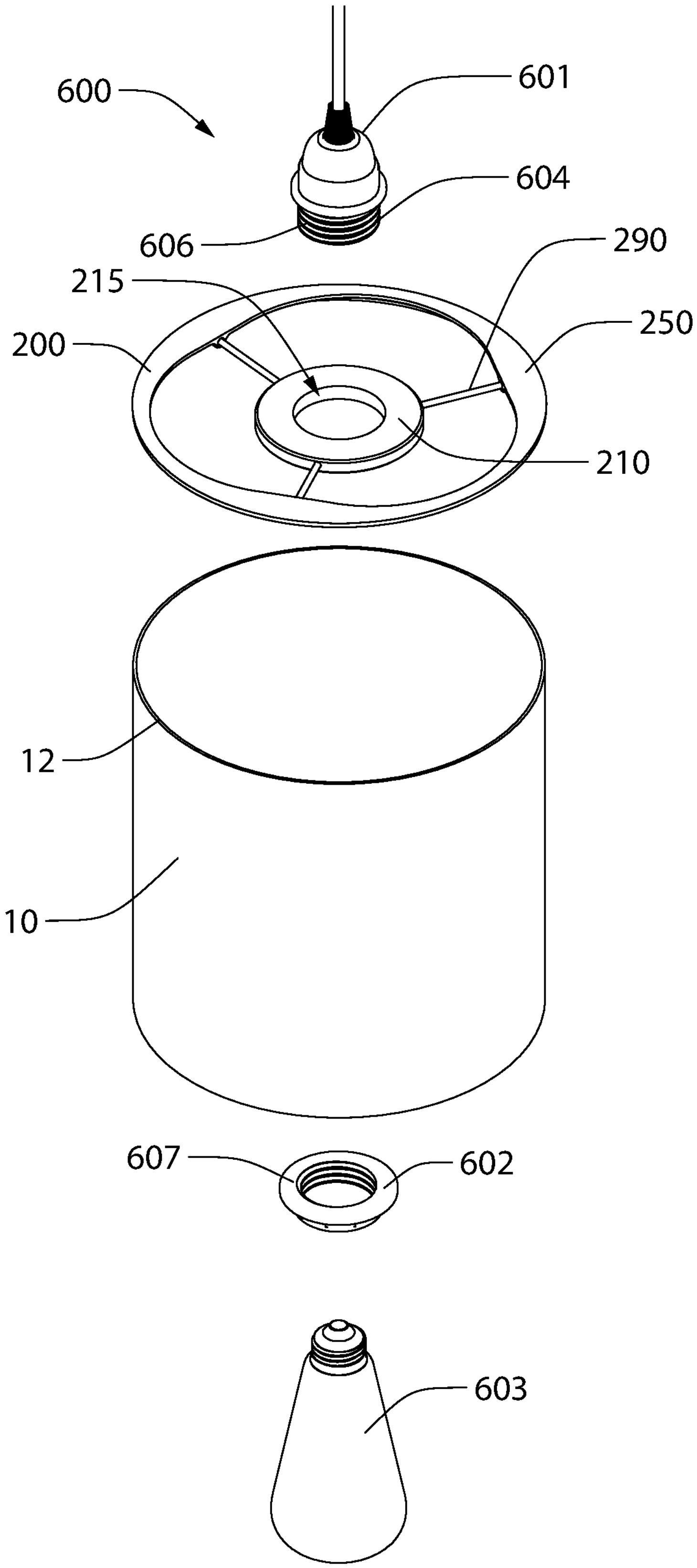
FIG. 19 is an exploded view illustrating the ring assembly and lampshade of FIG. 1, a light fixture, and a light source.
Figure 20:
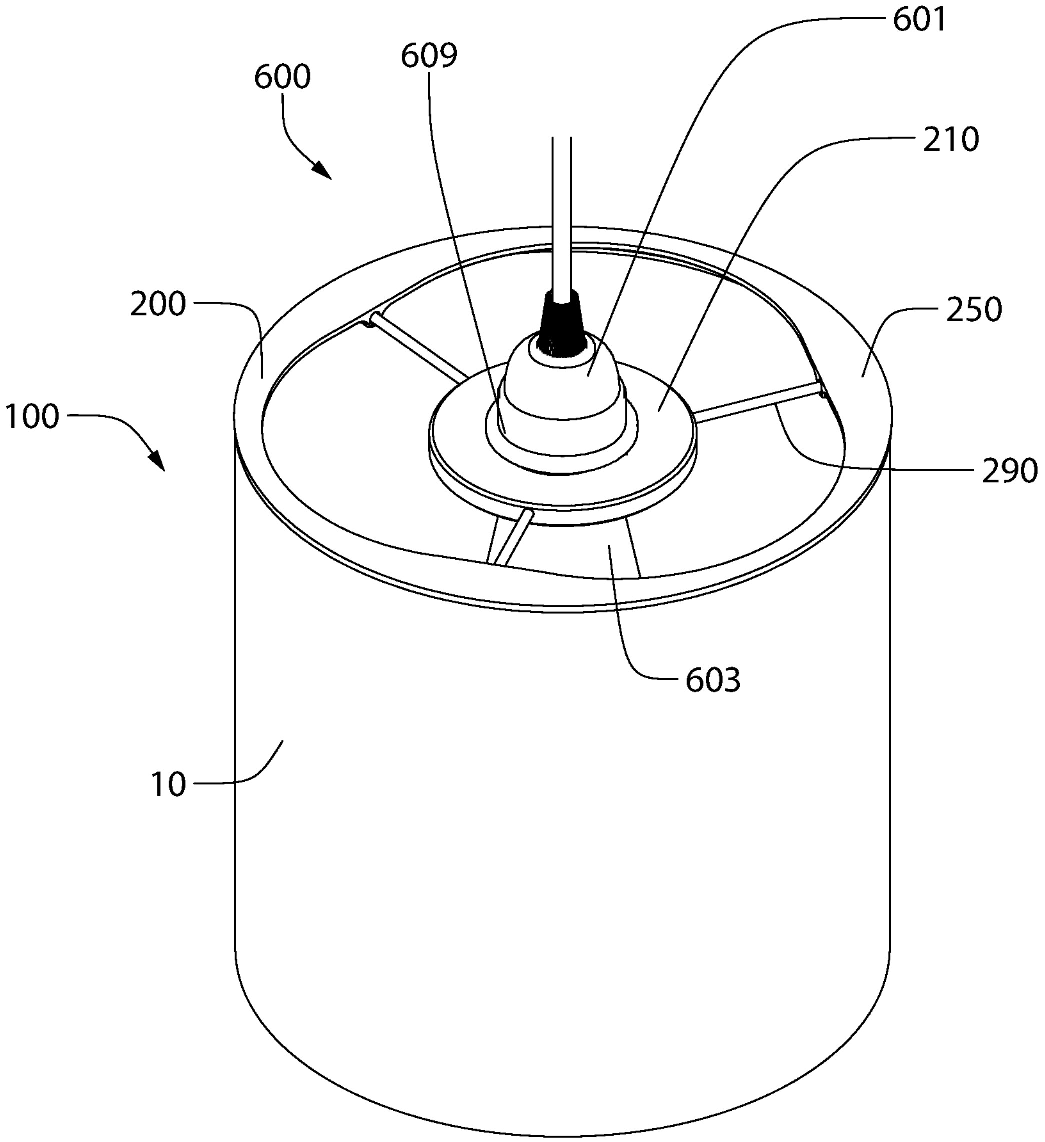
FIG. 20 is an assembled view of the components shown in FIG. 19.
Figure 21:
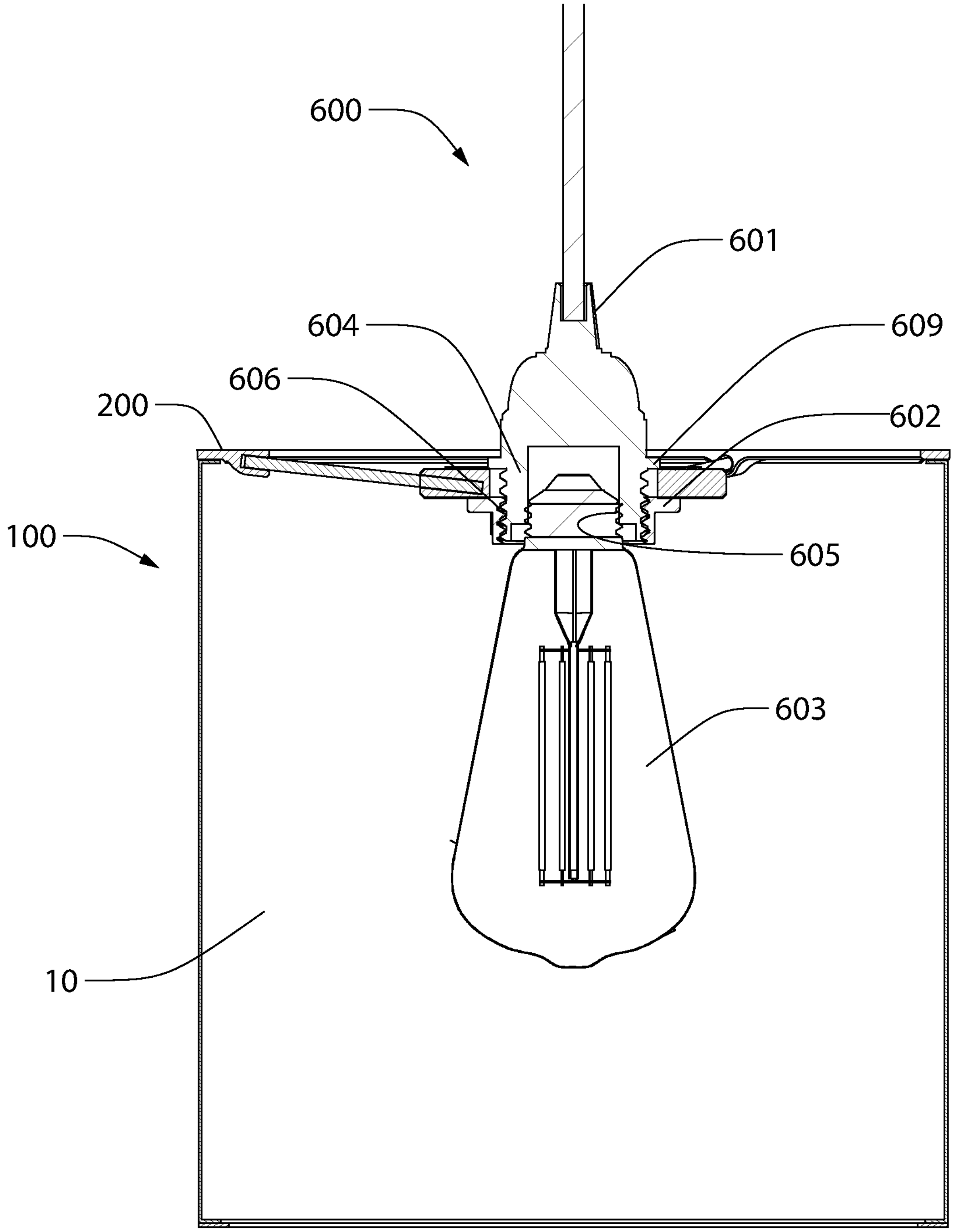
FIG. 21 is a cross-sectional view taken along line XXI-XXI of FIG. 20.

Referring to FIGS. 19-21, the use of the lampshade apparatus 100 of FIG. 1 with a pendant light fixture 600 will be described. The lampshade apparatus 100 comprises the lampshade 10 and the ring assembly 200 as previously described. The pendant light fixture 600 comprises a fixture component 601, an attachment collar 602, and a light source 603. The light source 603 may be a light bulb, which may be incandescent, LED, or the like. The fixture component 601 may comprise a socket 604 having interior threads 605 configured to mate with threads of the light source 603 to facilitate attachment of the light source 603 to the fixture component 601 and exterior threads 606 configured to mate with interior threads 607 of the attachment collar 602.

To assemble the parts, first the ring assembly 200 is assembled as previously described, and then the ring assembly 200 is attached to the top edge 12 of the lampshade 10 to form the lampshade apparatus 100. The ring assembly 200 may be attached to the top edge 12 of the lampshade 10 using adhesives or any of the other techniques described herein. Next, the socket 604 is inserted through the mounting hole 215 of the mounting hub 210 of the ring assembly 200. Next, the attachment collar 602 is coupled to the socket 604. In the exemplified embodiment, the attachment collar 602 is coupled to the socket 604 by engaging the exterior threads 606 of the socket 604 with the interior threads 607 of the attachment collar 602. That is, the attachment collar 602 may be screwed to the exterior of the socket 604. The coupling of the attachment collar 602 to the socket 604 holds the lamp ring apparatus 100 in place. That is, the attachment of the attachment collar 602 to the socket 604 also serves to attach the lamp ring apparatus 100 to the fixture component 601 by sandwiching the mounting hub 210 of the ring assembly 200 between the attachment collar 602 and a flange 609 of the fixture component 601. Finally, the light source 603 (i.e., the light bulb) is coupled to the socket 604 via engagement with the interior threads 605 of the socket 604. The light source 603 may be screwed to the socket 604 in the conventional manner.

Figure 22:
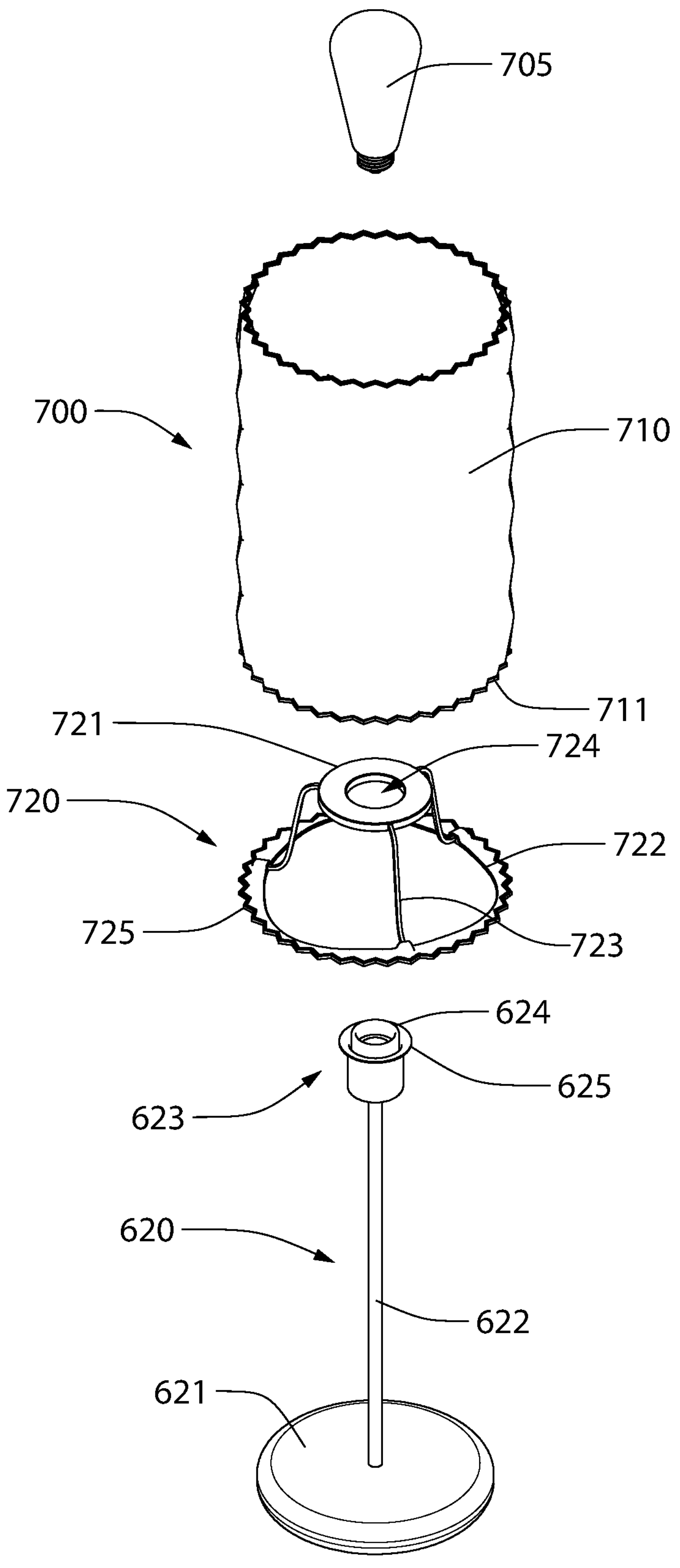
FIG. 22 is an exploded view illustrating a ring assembly, a lampshade, a light fixture, and a light source in accordance with another embodiment.
Figure 23:
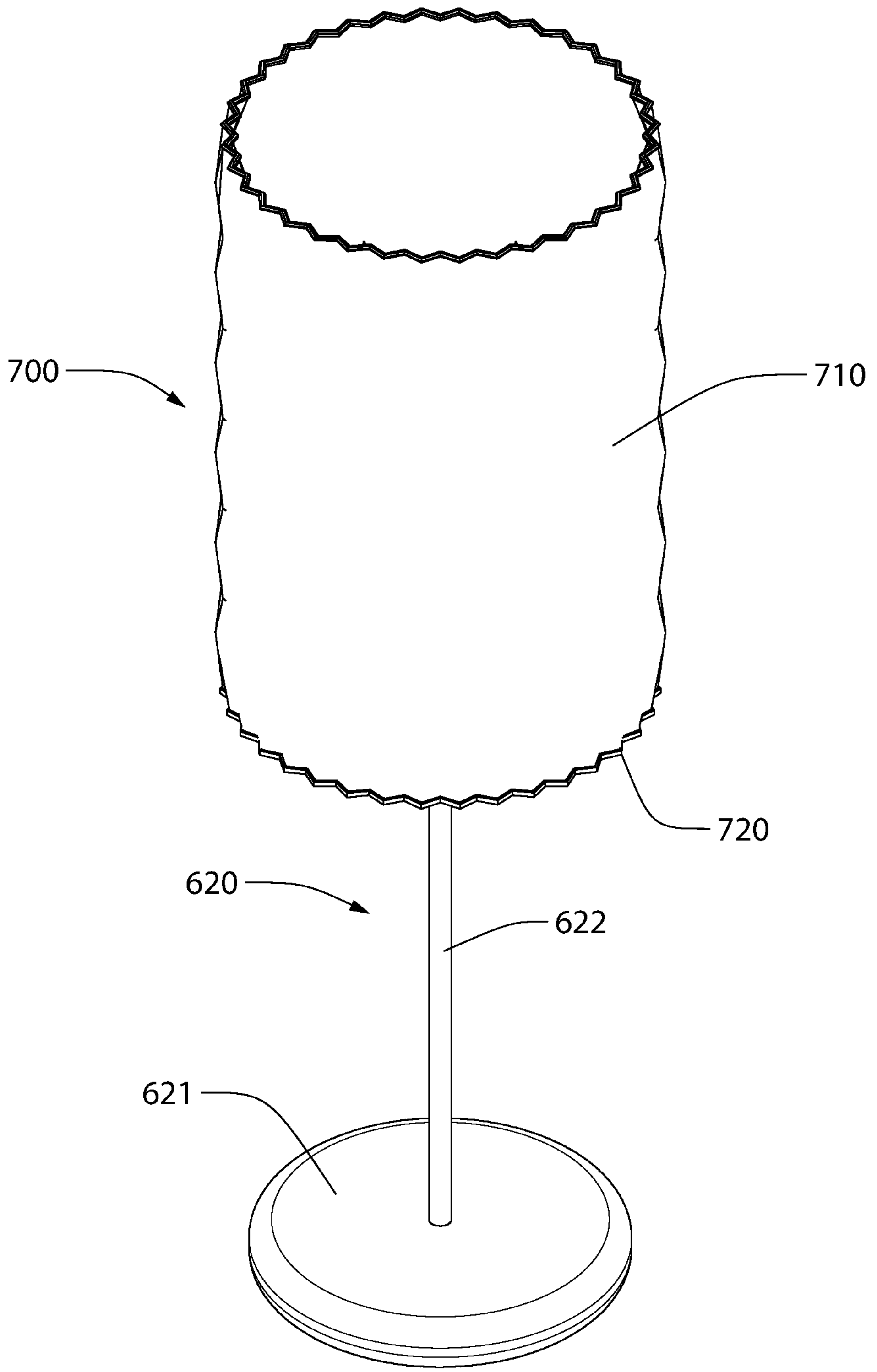
FIG. 23 is an assembled view of the components shown in FIG. 22.
Figure 24:
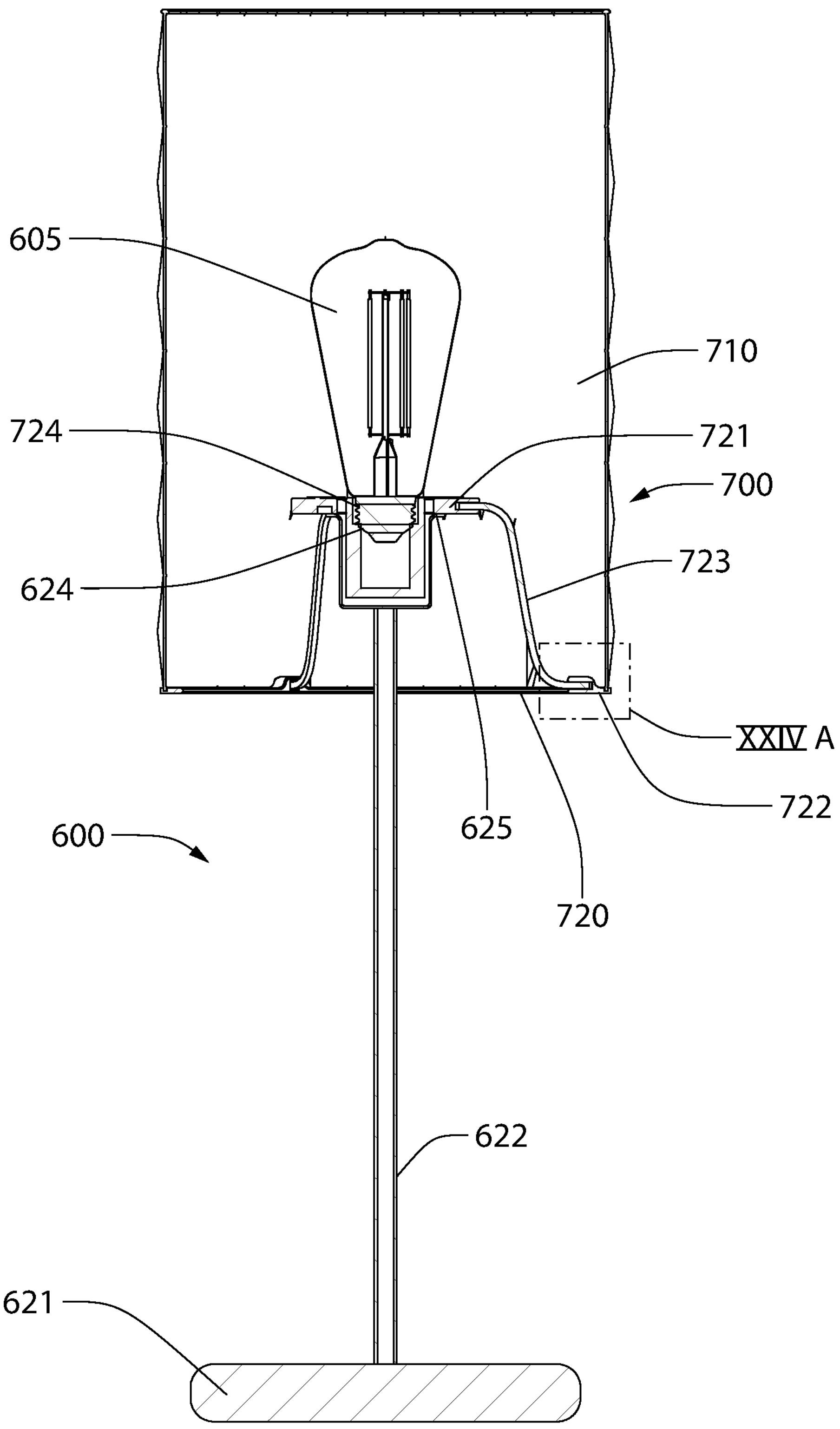
FIG. 24 is a cross-sectional view taken along line XXIV-XXIV of FIG. 23.

Referring to FIGS. 22-24, the use of a lampshade apparatus 700 with a floor lamp (or table lamp or, more generically, light fixture)) 620 will be described. The lampshade apparatus 700 comprises a lampshade 710 and a ring assembly 720. The ring assembly 720 may comprise a mounting hub 721, an outer ring 722, and a plurality of connectors 723. The connectors 723 may be detachably coupled to each of the mounting hub 721 and the outer ring 722 in the manner described above with reference to the previously described embodiments. While the specific structure, relative positioning of the components, and other details of the ring assembly 720 differ from the ones previously described, the overall concepts remain the same and are applicable. In this embodiment, the outer ring 722 of the ring assembly 720 is configured to be coupled to a bottom edge 711 of the lampshade 710 to form the lampshade apparatus 700. Furthermore, the mounting hub 721 is axially offset relative to the outer ring 722 in order to facilitate proper attachment to the floor lamp 620.

The floor lamp 620 comprises a base portion 621, a stand portion 622, and a fixture portion 623. The fixture portion 623 comprises a socket 624 and a flange 625.

To assemble the parts, first the ring assembly 720 is assembled by coupling the connectors 723 to the mounting hub 721 and to the outer ring 722. Next, the ring assembly 720 is coupled to the bottom edge 711 of the lampshade 710 using the techniques described herein. Next, the lampshade apparatus 700 is translated downwardly over top of the fixture portion 623 of the floor lamp 720 until at least a portion of the fixture portion 623 protrudes through a mounting hole 724 of the mounting hub 721 and the mounting hub 721 rests atop of the flange 625 of the fixture portion 623. Next, a light bulb 705 is screwed into the socket 624. The light bulb 705 may have a cross-sectional area that is greater than the cross-sectional area of the mounting hole 724 so that the lampshade apparatus 700 cannot be translated upwardly while the light bulb 705 is screwed into the socket 624. Thus, the light bulb 705 may function to secure the lampshade apparatus 700 in place on the floor lamp 720.

Figure 24A:
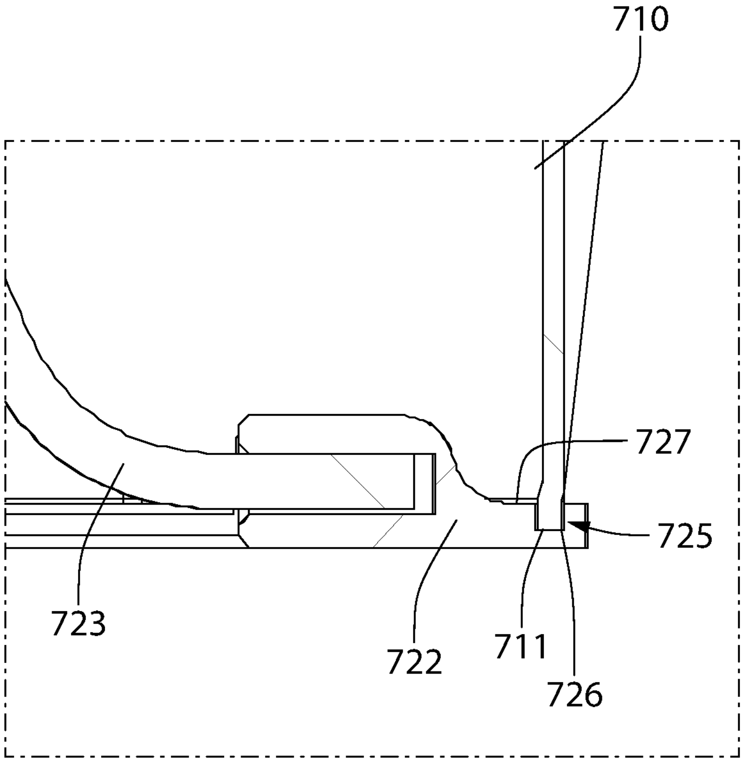
FIG. 24A is a close-up view of area XXIVA of FIG. 24.

As shown in FIG. 24A, the outer ring 722 of the ring assembly 720 may comprise an alignment feature 725 to facilitate alignment between the outer ring 722 and the lampshade 710. In the exemplified embodiment, the alignment feature 725 comprises a recess 726 formed into the bottom surface 727 of the outer ring 722 which faces the lampshade 710 when the ring assembly 720 is coupled to the lampshade 710. The bottom edge 711 of the lampshade 710 is configured to nest within the recess 726 when the lampshade 710 is coupled to the ring assembly 720 to assist with alignment and attachment between the lampshade 710 and the ring assembly 720. The recess 726 may have a wavy/scalloped geometry that matches the wavy/scalloped geometry of the bottom edge 711 of the lampshade 710.

Figure 25:
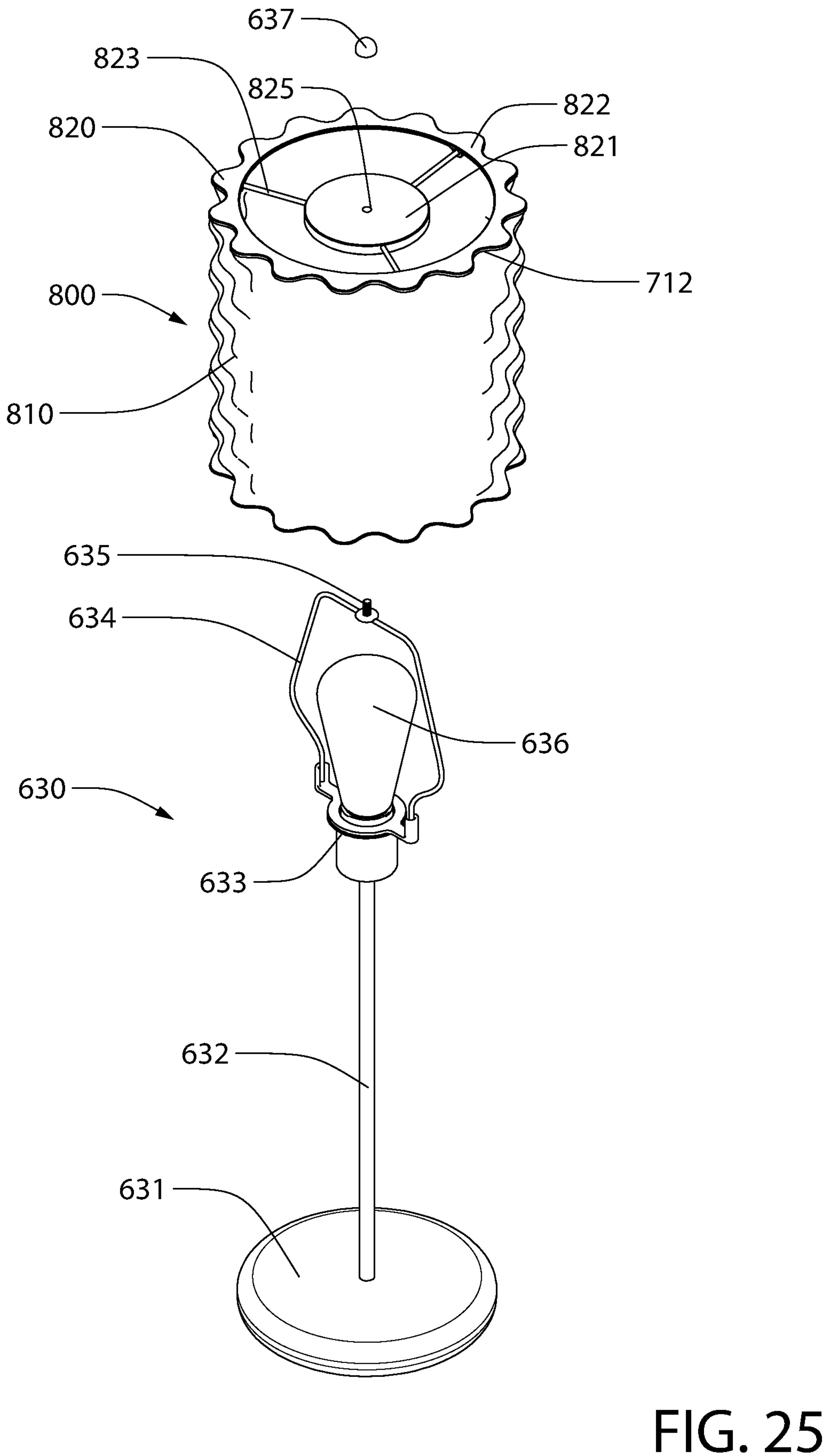
FIG. 25 is an exploded view illustrating a ring assembly, a lampshade, a light fixture, and a light source in accordance with still another embodiment.
Figure 26:
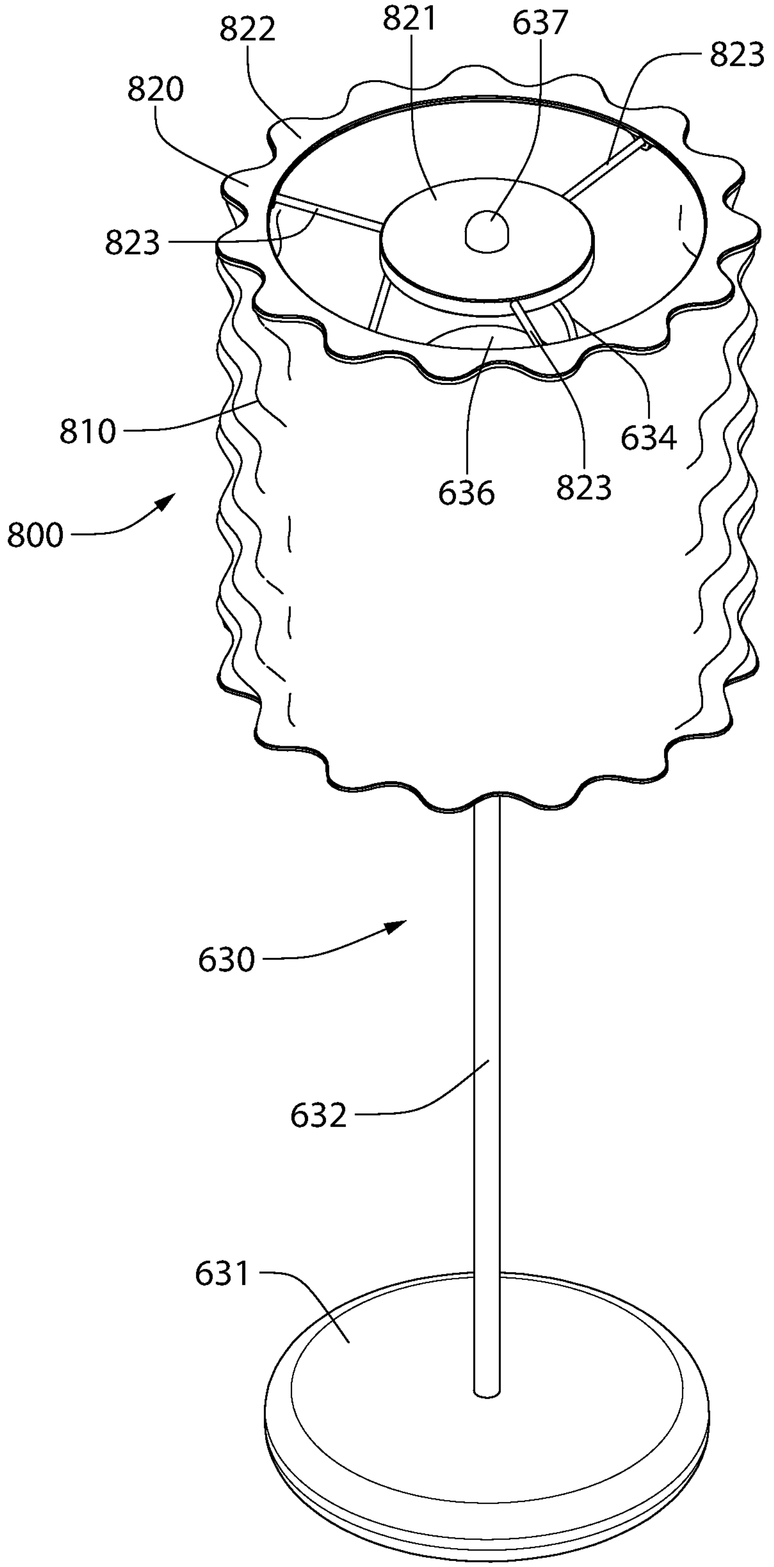
FIG. 26 is an assembled view of the components shown in FIG. 25.
Figure 27:
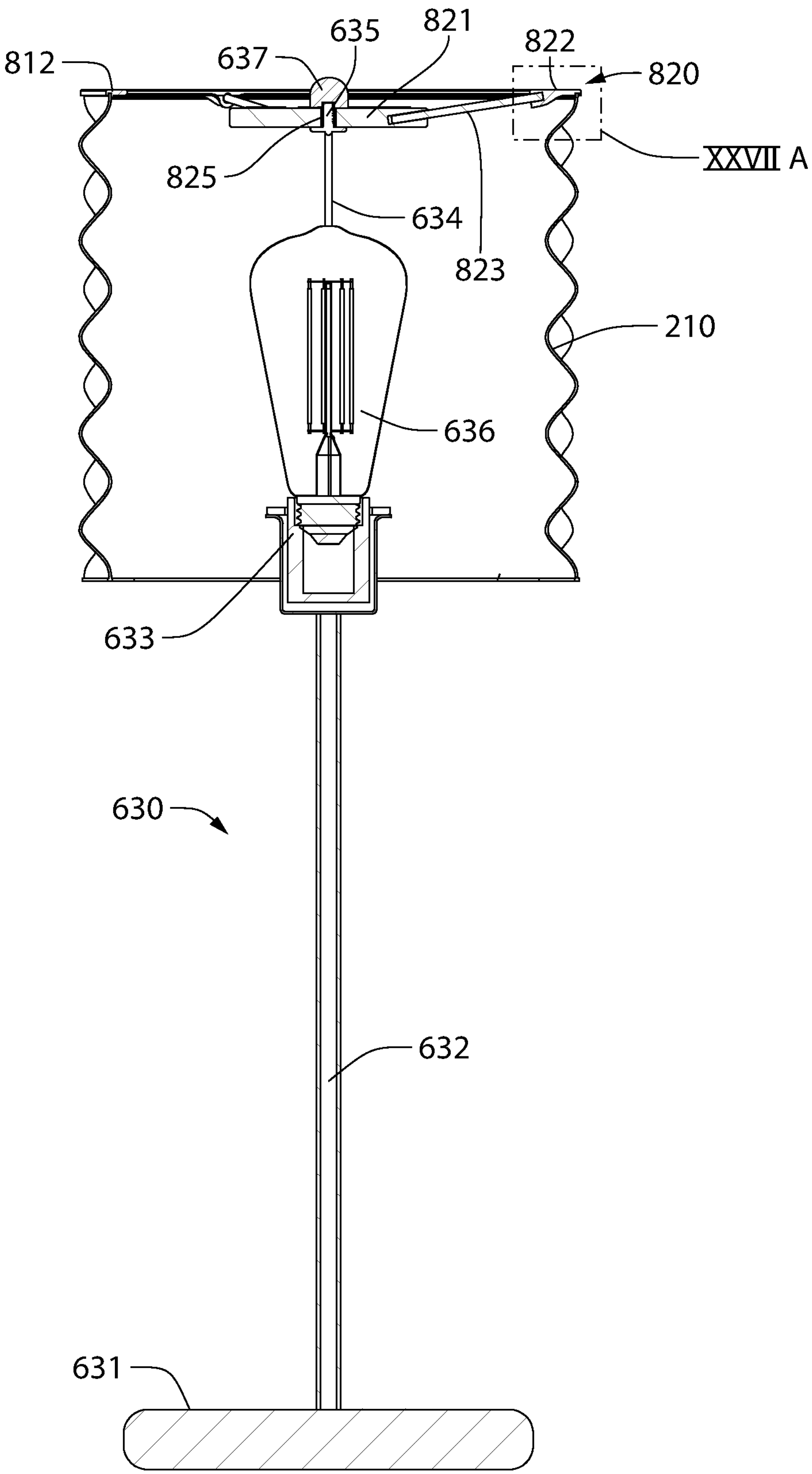
FIG. 27 is a cross-sectional view taken along line XXVII-XXVII of FIG. 26.

Referring to FIGS. 25-27, the use of a lampshade apparatus 800 with a floor lamp (or table lamp or, more generically, light fixture) 630 will be described. The lampshade apparatus 800 comprises a lampshade 810 and a ring assembly 820. The ring assembly 820 may comprise a mounting hub 821, an outer ring 822, and a plurality of connectors 823. The connectors 823 may be detachably coupled to each of the mounting hub 721 and the outer ring 822 in the manner described above with reference to the previously described embodiments. While the specific structure, relative positioning of the components, and other details of the ring assembly 820 differ from the ones previously described, the overall concepts remain the same and are applicable. In this embodiment, the outer ring 822 of the ring assembly 820 is configured to be coupled to a top edge 812 of the lampshade 810 to form the lampshade apparatus 800.

The floor/table lamp 630 comprises a base portion 631, a stand portion 632, a socket portion 633, and a harp portion 634. A fastener component 625 may be coupled to and protrude upwardly from the top end of the harp portion 634. A light bulb 636 may be coupled to the socket portion 633 in the conventional manner. In this embodiment, the light bulb 636 may be coupled to the socket portion 633 before the lampshade apparatus 800 is attached to the floor/table lamp 630, although this is not required in all embodiments.

To assemble the parts, first the ring assembly 820 is formed/assembled by attaching the connectors 823 to the mounting hub 721 and to the outer ring 822 using the techniques described above. Next, the ring assembly 820 is coupled to the top edge 712 of the lampshade 810. The ring assembly 820 may be coupled to the top edge 712 of the lampshade 810 with adhesives, or any of the other techniques described herein. The attached ring assembly 820 and the lampshade 810 forms the lampshade apparatus 800.

In this embodiment, the mounting hub 821 has a mounting hole 825 which has a much smaller diameter than the previous embodiments. The reason for this is that the mounting hole 825 is configured to receive the fastener component 625 of the floor/table lamp 630, which is much smaller in diameter than the sockets of the prior embodiments which are inserted through the mounting hole. Nonetheless, after the lampshade apparatus 800 is assembled, the lampshade apparatus 800 is lowered onto the floor/table lamp 630 until the fastener component 625 passes through the mounting hole 825 of the mounting hub 821. Next, a finial 637 is screwed to the portion of the fastener component 625 that protrudes through the mounting hole 825 to lock the lampshade apparatus 800 to the floor/table lamp 630.

Figure 27A:
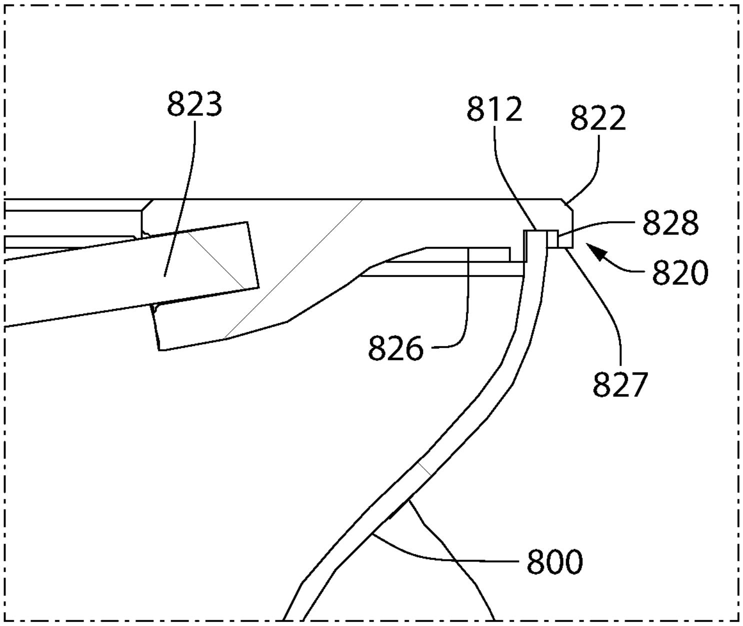
FIG. 27A is a close-up view of area XXVIIA of FIG. 27.

As best seen in FIG. 27A, the outer ring 822 of the ring assembly 820 may comprise a bottom surface 826 that faces the lampshade 810. Furthermore, the outer ring 822 may comprise an alignment feature 827 in the bottom surface 826. The alignment feature 827 may be a recess or channel 828 that is configured to receive the top edge 812 of the lampshade 810 when the ring assembly 820 is coupled to the lampshade 810. That is, the top edge 812 of the lampshade 810 may be inserted into the recess or channel 828 in the bottom surface 826 of the outer ring 822 to facilitate the attachment of the ring assembly 820 to the lampshade 810. Adhesive or the like may be introduced into the recess or channel 828 to create a fixed coupling between the lampshade 810 and the ring assembly 820. The recess or channel 828 may have a shape that matches an edge geometry of the top edge 812 of the lampshade 810 to allow the top edge 812 of the lampshade 810 to fit snugly within the recess or channel 828.

One advantage of the ring assembly 200 described herein is that it can be made to order. That is, the various parts of the ring assembly 200 can be designed to fit an existing lampshade and/or an existing light fixture. Thus, if a consumer wants to retrofit a light fixture, the ring assembly 200 can be made so that it is configured to be attached to the existing light fixture. Specifically, the mounting hub 210 of the ring assembly 200 may be designed to ensure it is able to be attached to the specific light fixture it is intended to be used with (different light fixtures have different attachment mechanisms, as described herein). Furthermore, the ring assembly 200 may be made so that it is configured to be attached to an existing lampshade. Specifically, the outer ring 250 of the ring assembly 200 may be designed to ensure it is able to be attached to a specific lampshade. Finally, the ring assembly 200 may be designed to have a specific relative positioning between the mounting hub 210 and the outer ring 250 to optimize its functionality with a specific light fixture.

Additional benefits of the various ring assemblies described herein include: increased diffusion of light upwards; print-in-place locating geometries (i.e., alignment features) to ensure concentricity of ring assembly and lampshade body, customizable to myriad of different shade types; minimized material usage and print times for ring assembly; minimized first layer surface area for inner and outer rings relative to the orthographic projection of lampshade perimeter; fully adjustable connector pin angle, allowing for socket to be offset to different locations in lampshade body; outer ring is adaptable to a myriad of different shade sizes, shapes and patterns; drives value in pendant lamp, floor lamp, chandelier and desk lamp product categories; augmented flex on drop impacts for overall system because the connector pins facilitate movements along axis; floating nature of connector pins facilitates easy deconstruction and separation of materials into homogeneous groupings at the end of product lifecycle by breaking the contact between outer ring and lampshade which results in the connector pins flexing out of place.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A lampshade ring assembly comprising:

a mounting hub comprising a plurality of first mounting elements arranged in a spaced apart manner;

an outer ring comprising a plurality of second mounting elements arranged in a spaced apart manner;

a plurality of connectors, each of the connectors comprising a first end portion having a third mounting element and a second end portion having a fourth mounting element;

wherein each of the connectors is configured to be detachably coupled to: (1) the mounting hub via engagement between one of the first mounting elements of the mounting hub and the third mounting element of the connector; and (2) the outer ring via engagement between one of the second mounting elements of the outer ring and the fourth mounting element of the connector; and wherein the outer ring is configured to be coupled to a lampshade and the mounting hub is configured to be coupled to a light fixture.

2. The lampshade ring assembly according to claim 1 wherein the mounting hub, the outer ring, and the connectors are formed as separate parts, and wherein the connectors are configured to be manually and repeatably attachable to and detachable from each of the mounting hub and the outer ring without any tools.

3. The lampshade ring assembly according to claim 1 further comprising:

each of the first mounting elements comprises a hub aperture;

each of the second mounting elements comprises a ring aperture;

for each of the connectors, the first end portion of the connector forms the third mounting element and the second end portion of the connector forms the fourth mounting element; and wherein for each of the connectors:

the engagement between the one of the first mounting elements of the mounting hub and the third mounting element of the connector comprises the first end portion of the connector nesting within one of the hub apertures; and the engagement between the one of the second mounting elements of the outer ring and the fourth mounting element of the connector comprises the second end portion of the connector nesting within one of the ring apertures.

4. The lampshade ring assembly according to claim 1 further comprising:

the mounting hub comprising a top surface, a bottom surface, and an outer surface extending between the top and bottom surfaces, a mounting hole formed through the mounting hub from the top surface to the bottom surface to facilitate attachment of the mounting hub to the light fixture, and wherein each of the plurality of first mounting elements comprises a hub aperture formed into the outer surface of the mounting hub; and the outer ring comprising an inner surface that faces the outer surface of the mounting hub when the mounting hub and the outer ring are coupled together with the connectors, and wherein each of the plurality of second mounting elements comprises a ring aperture formed into the inner surface of the outer ring; and wherein when the connectors are coupled to the mounting hub and to the outer ring, the connectors extend radially between the outer surface of the mounting hub and the inner surface of the outer ring.

5. The lampshade ring assembly according to claim 4 wherein each of the hub apertures and each of the ring apertures is a blind hole.

6. The lampshade ring assembly according to claim 4 wherein the hub apertures are formed into the outer surface of the mounting hub and are arranged in a circumferentially spaced apart manner, wherein the ring apertures are formed into the inner surface of the outer ring and are arranged in a circumferentially spaced apart manner, and wherein when the mounting hub is coupled to the outer ring with the connectors, each of the hub apertures is radially aligned with one of the ring apertures and the connectors extend linearly between the mounting hub and the outer ring.

7. The lampshade ring assembly according to claim 1 wherein the mounting hub and the outer ring are formed from a thermoplastic material, and wherein the plurality of connectors are formed from a material selected from the group consisting of steel, aluminum, brass, plastic, and wood.

8. The lampshade ring assembly according to claim 1 wherein the outer ring comprises a top surface, a bottom surface, and an inner surface, the plurality of second mounting elements being located along the inner surface, and wherein one of the top and bottom surfaces comprises an alignment feature that is configured to mate with a corresponding alignment feature on the lampshade when the outer ring is coupled to the lampshade.

9. The lampshade ring assembly according to claim 8 wherein the alignment feature comprises a channel formed into one of the top and bottom surfaces of the outer ring, and wherein the channel is configured to receive an edge portion of the lampshade.

10. The lampshade ring assembly according to claim 1 wherein the outer ring comprises an inner surface and an outer surface, and wherein at least one of the inner and outer surfaces is non-circular.

11. A lampshade apparatus comprising:

a ring assembly comprising:

a mounting hub comprising a top surface, a bottom surface, and an outer surface, a fixture mounting hole extending through the mounting hub from the top surface to the bottom surface, and a plurality of hub apertures formed into the outer surface of the mounting hub and arranged in a spaced apart manner;

an outer ring comprising an inner surface that bounds a central aperture, a plurality of ring apertures formed into the inner surface of the outer ring and arranged in a spaced apart manner;

a plurality of connectors, each of the connectors being elongated between a first end of the connector and a second end of the connector, each of the plurality of connectors being detachably coupled to the mounting hub and to the outer ring by inserting the first end of each of the connectors into one of the hub apertures of the mounting hub and inserting the second end of each of the connectors into one of the ring apertures of the outer ring, thereby forming the ring assembly; and a lampshade having a top edge and a bottom edge, the ring assembly being coupled to the lampshade with the outer ring in engagement with one of the top and bottom edges of the lampshade.

12. The lampshade apparatus according to claim 11 wherein prior to attaching the ring assembly to the lampshade, each of the plurality of connectors is configured to be detached from the mounting hub and the outer ring solely by manual user force.

13. The method according to claim 12 wherein the plurality of connectors are manually attachable to the mounting hub and to the outer ring solely by manual force, and wherein prior to attaching the ring assembly to the lampshade the plurality of connectors are repeatably attachable to and detachable from the mounting hub and the outer ring solely by manual force.

14. The lampshade apparatus according to claim 11 wherein the outer ring comprises an outer surface, and wherein at least one of the inner and outer surfaces of the outer ring is non-circular.

15. The lampshade apparatus according to claim 11 further comprising:

the outer ring comprising a top surface and a bottom surface, the central aperture extending from the top surface to the bottom surface, one of the top and bottom surfaces comprising an alignment channel; and wherein the one of the top and bottom edges of the lampshade nests within the alignment channel when the ring assembly is coupled to the lampshade.

16. A method of assembling a lampshade apparatus, the method comprising:

attaching each of a plurality of connectors to a mounting hub by engaging a third mounting element of each of the connectors to one of a plurality of first mounting elements of the mounting hub;

after the plurality of connectors are attached to the mounting hub, attaching each of the plurality of connectors to an outer ring by engaging a fourth mounting element of each of the connectors to one of a plurality of second mounting elements of the outer ring, thereby forming a ring assembly of the lampshade apparatus; and attaching the ring assembly to a top edge or a bottom edge of a lampshade, thereby forming the lampshade apparatus that is configured to be coupled to a light fixture.

17. The method according to claim 16 wherein the plurality of connectors are detachably coupled to each of the mounting hub and the outer ring solely by manual force such that the plurality of connectors can be detached from the mounting hub and the outer ring prior to attaching the ring assembly to the lampshade.

18. The method according to claim 16 wherein the ring assembly is attached to the top or bottom edge of the lampshade with an adhesive.

19. The method according to claim 18 wherein during the attachment of the connectors to the outer ring, the outer ring is flexed and manipulated to facilitate alignment between the connectors and the second mounting elements of the outer ring, and wherein after attaching the ring assembly to the lampshade, the outer ring is no longer capable of flexing.

20. The method according to claim 16 further comprising:

the third mounting element of each of the connectors comprising a first end portion of the connector, and wherein the attaching each of the plurality of connectors to the mounting hub comprises inserting the first end portion of each of the connectors into a respective hub aperture formed into an outer surface of the mounting hub; and the fourth mounting element of each of the connectors comprising a second end portion of the connector, and wherein the attaching each of the plurality of connectors to the outer ring comprises inserting the second end portion of each of the connectors into a respective ring aperture formed into an inner surface of the outer ring.

* * * * *